United States Patent
Saiki et al.

(10) Patent No.: US 7,203,002 B2
(45) Date of Patent: Apr. 10, 2007

(54) POLARIZER, POLARIZING PLATE, LIQUID CRYSTAL DISPLAY, AND IMAGE DISPLAY, AND A METHOD FOR PRODUCING THE POLARIZER

(75) Inventors: Yuuji Saiki, Ibaraki (JP); Hideyuki Usui, Ibaraki (JP); Takahisa Konishi, Ibaraki (JP); Seiji Umemoto, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 390 days.

(21) Appl. No.: 10/361,025

(22) Filed: Feb. 10, 2003

(65) Prior Publication Data

US 2004/0001169 A1  Jan. 1, 2004

(30) Foreign Application Priority Data

Feb. 12, 2002 (JP) .............................. 2002-033896

(51) Int. Cl.
G02B 5/30 (2006.01)

(52) U.S. Cl. ..................... 359/491; 359/490; 359/500; 349/96

(58) Field of Classification Search ............... 359/490, 359/491, 492; 362/31; 349/65
See application file for complete search history.

(56) References Cited

U.S. PATENT DOCUMENTS

| | | | | |
|---|---|---|---|---|
| 4,802,745 A | * | 2/1989 | Okada et al. ............... 359/491 |
| 4,859,039 A | * | 8/1989 | Okumura et al. ........... 359/491 |
| 5,882,774 A | * | 3/1999 | Jonza et al. ................. 428/212 |
| 6,199,995 B1 | | 3/2001 | Umemoto et al. ............. 362/31 |
| 6,683,717 B1 | * | 1/2004 | Miyatake et al. ........... 359/490 |
| 7,070,913 B2 | * | 7/2006 | Kozenkov et al. .......... 430/321 |
| 2002/0005922 A1 | | 1/2002 | Umemoto et al. ............. 349/65 |
| 2003/0152717 A1 | * | 8/2003 | Kawahara et al. ......... 428/1.31 |
| 2004/0146663 A1 | * | 7/2004 | Paukshto et al. .......... 428/1.31 |

FOREIGN PATENT DOCUMENTS

| | | |
|---|---|---|
| EP | 1 160 591 | 12/2001 |
| JP | 8-304624 | 11/1996 |
| JP | 08304624 A  * | 11/1996 |
| JP | 11-250715 | 9/1999 |
| JP | 2001-318379 | 11/2001 |
| JP | 2001-343529 | 12/2001 |

OTHER PUBLICATIONS

HunterLab Application Note, Aug. 1-15, 196, vol. 8, No. 9, pp. 1-4.*

* cited by examiner

*Primary Examiner*—Arnel Lavarias
(74) *Attorney, Agent, or Firm*—Westerman, Hattori, Daniels & Adrian, LLP

(57) ABSTRACT

A polarizer used for an image display such as a liquid crystal display, a plasma display, and an electroluminescence display, and the polarizer suppresses coloring of transmitted light. The polarizer includes a polymer film having a difference of 10% or less between the maximum and the minimum of a first transmittance in a wavelength ranging from 400 nm to 700 nm.

17 Claims, 6 Drawing Sheets

POLARIZER, POLARIZING PLATE, LIQUID CRYSTAL DISPLAY, AND IMAGE DISPLAY, AND A METHOD FOR PRODUCING THE POLARIZER

BACKGROUND OF THE INVENTION

1. Field of the Invention

The present invention relates to a polarizer, a polarizing plate, a liquid crystal display, an image display, and a method for producing a polarizer.

2. Description of the Related Art

Since a liquid crystal display (LCD) is a non-self-luminance display, the image display should be performed by illuminating its liquid crystal panel. For a lighting system of a typical liquid crystal display, a backlight, a front light or the like disposed on the front or backside of a liquid crystal panel, is used (see JP 11-(1999) 250715 A). However, since the front light or the backlight has a thickness of about 2 mm or more, the thickness of the entire liquid crystal display is increased considerably.

For solving the problem, a liquid crystal display is disclosed, and the liquid crystal display has a sidelight disposed on a side face of a liquid crystal panel and an optical controlling layer arranged on a surface of the liquid crystal panel. A light beam emitted from the sidelight is transmitted through the interior of the liquid crystal display. The optical controlling layer reflects the emitted light so as to transmit the light through the entire liquid crystal display and to illuminate the front surface of the liquid crystal panel (see, e.g., JP 2001-318379 A). The optical controlling layer is thinner than the backlight or the front light. For example, the thickness of the optical controlling layer is not more than 200 μm. As a result, the thickness of the liquid crystal display having the sidelight and the optical controlling layer can be decreased remarkably in comparison with a liquid crystal display having a backlight or the like.

However, the liquid crystal display having a sidelight and an optical controlling layer has a disadvantage that emitted light is colored during the transmission in a direction opposite to the sidelight.

An object of the present invention is to provide a polarizer that can be used for image displays such as liquid crystal displays, and the polarizer can suppress coloring of the transmitted light.

SUMMARY OF THE INVENTION

As a result of keen studies, the inventors focused on a first main transmittance of the polarizer in a wavelength range of 400 nm to 700 nm. Coloring of transmitted light is suppressed by using a polarizer having a first main transmittance in which a difference between a maximum and a minimum transmittance is not more than 10%, and this results in the present invention.

Namely, the present invention provides a polarizer having a first main transmittance in which a difference between a maximum and a minimum transmittance is not more than 10% in a wavelength ranging from 400 nm to 700 nm.

The first main transmittance denotes a transmittance for a case where an oscillation direction of incident linearly polarized light and a transmission axis of a polarizer matches each other. The first main transmittance ($k_1$) is represented by the following Equation 1, using values of a parallel transmittance and a cross transmittance:

$$k_1 = 0.5 \times \sqrt{2} \{[(H_0+H_{90})^{1/2} + (H_0-H_{90})^{1/2}]\} \qquad \text{Equation 1}$$

wherein $H_0$ denotes a parallel transmittance and $H_{90}$ denotes a cross transmittance.

DETAILED DESCRIPTION OF THE INVENTION

Figure 1:
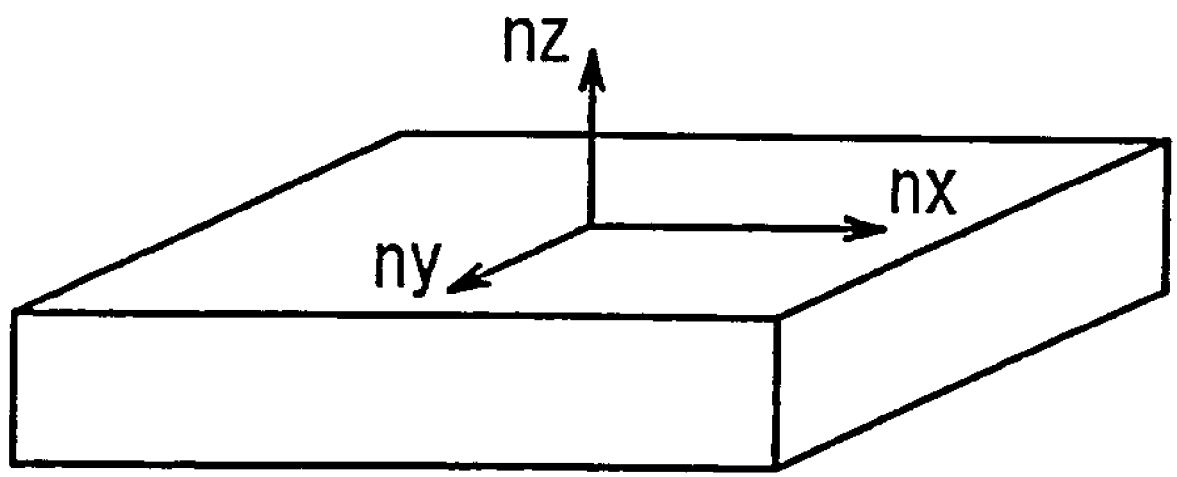
FIG. 1 is a schematic view showing axial directions in a protective layer.

In a polarizer according to the present invention, a difference between a maximum and a minimum of a first main transmittance in a wavelength range of 400 nm to 700 nm is at most 10%, preferably at most 7%, and more preferably, at most 5%. Also in a polarizing plate according to the present invention, a minimum of a first main transmittance in a wavelength range of 400 nm to 700 nm is, for example, at least 70%, or more preferably, at least 80%, and more preferably, at least 85%. When the wavelength is shorter than 400 nm or longer than 700 nm, light is not emitted substantially from a lamp as a light source, i.e., visual sensitivity is inferior. For this reason, optical characteristics in a range of wavelength of 400 nm to 700 nm are important for liquid crystal displays.

In the polarizer, a single transmittance after being subjected to a luminosity correction (JIS Z 7820) is, for example, at least 45%. When a polarizer has such characteristics, brightness and display quality of an image display are improved. In the polarizer, it is preferable that a single transmittance subjected to a luminosity correction is at least 45.5%, and more preferably, at least 46%. Furthermore, it is preferable that the polarization degree of the polarizer is at least 95%.

In the polarizer, a parallel value 'b' is, for example, from −2 to 0.5. By using the polarizer provided with the characteristics, the image display can provide a display of bright white color. In the polarizer, the parallel value 'b' ranges preferably from −1.5 to 0.2, and more preferably, from −1 to 0.

The parallel value 'b' is defined by a Hunter Lab Color System. Specifically for example, the parallel value 'b' is calculated by measuring a tristimulus values (X, Y, Z) of a sample by using a spectrophotometer or a photoelectric colorimeter in accordance with JIS K 7105 5.3, and substituting these values as the color difference formula in Lab space into the following Hunter's formula. For the measurement, an Auxiliary Illuminant C (JIS Z 8720) is used in general.

Parallel value '$b$'$=7.0(Y-0.847Z)/Y^{1/2}$

In the formula, Y and Z are tristimulus values of XYZ color system subjected to a luminosity correction in a visual field of 2° with the auxiliary luminant C.

The polarizers of the present invention can be produced from polymer films, more specifically, hydrophilic polymer films such as a polyvinyl alcohol (PVA) film, a partially formalized PVA-based film, a film based on ethylene-vinyl acetate copolymer and partially-saponified films thereof, and hydrophilic polymer films such as a cellulosic film. Among them, a PVA-based film is advantageous.

The polarizer of the present invention is used particularly preferably for a reflective LCD of black-and-white display. By using the polarizer, a bright and white display is obtainable during a white display.

An example of methods for producing a polarizer of the present invention is described below. The polarizer can be produced by subjecting the polymer film to treatments including swelling, dyeing, crosslinking and stretching such as a uniaxial stretching, and subsequently drying. The respective treatments of the dyeing, crosslinking and stretching treatments can be carried out separately or simultaneously, and the order for the treatments can be determined arbitrarily. Specific descriptions follow. The following method is not limitative as long as a polarizer produced by the method satisfies the above condition that a difference between the maximum and minimum the first main transmittance is not more than 10% in a wavelength from 400 nm to 700 nm.

(1) Swelling Treatment

The polymer film is impregnated in a swelling bath for swelling and stretching. The polymer film as described above has a thickness of 20 μm to 200 μm, or more preferably, the thickness range is from 30 μm to 150 μm, particularly preferably from 40 μm to 100 μm.

For the swelling bath, water, an aqueous solution of glycerol or the like can be used. Among them, water is preferred. It is preferable that the temperature of the swelling bath ranges from 10° C. to 50° C., more preferably from 20° C. to 45° C., particularly preferably from 30° C. to 40° C. Though the time for impregnation in the swelling bath is not limited specifically, preferably it ranges from 20 seconds to 240 seconds, more preferably from 30 seconds to 180 seconds, and particularly preferably from 40 seconds to 150 seconds.

Alternatively, the swelling treatment can be skipped and the following step of dyeing treatment can be carried out.

(2) Dyeing Treatment

The polymer film is pulled out of the swelling bath, impregnated, for example, in a dye bath containing a dichroic material, and further stretched uniaxially in the dye bath. That is, the film is impregnated for adsorbing the dichroic material and stretched for orienting the dichroic material in one direction.

Any of well-known materials can be used for the dichroic material. The examples include iodine and organic dyestuffs. Examples of the organic dyestuffs include Red BR, Red LR, Red R, Pink LB, Rubine BL, Bordeaux GS, Sky blue LG, Lemon yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo red, Brilliant violet BK, Suprablue G, Suprablue GL, Direct sky blue, Direct first orange S, First black, and Supraorange GL. Among these dichroic materials, for example, iodine is preferably used to provide high transmittance and high polarization degree.

Each of these dichroic materials can be used alone or combined with at least one of the dichroic materials. The organic dyestuff can be used preferably in a state combined with at least one of other dyestuffs for neutralization of the visible ray region. Specific examples of the combinations include a combination of Congo red and Suprablue G, Supraorange GL and Direct sky blue, and Direct sky blue and First black.

The solution for the dye bath can be prepared by dissolving the dichroic material in a solvent. For example, water can be used for the solvent, and an organic solvent compatible with water can be included. Though the concentration of the dichroic material in the solution is not limited specifically, preferably it ranges from 0.01 wt % to 1 wt %, more preferably from 0.03 wt % to 0.8 wt %, and particularly preferably from 0.05 wt % to about 0.6 wt %.

Though the time for impregnating the polymer film in the dye bath is not limited specifically, it preferably ranges from 5 seconds to 10 minutes, more preferably from 10 seconds to 5 minutes, and particularly preferably from 20 seconds to 3 minutes. A preferable range for the temperature of the dye bath is, for example, from 10° C. to 50° C., more preferably from 15° C. to 45° C., and particularly preferably from 20° C. to 40° C.

When pulling the polymer film out of the bath, drops of the solution can be removed, for example, by using a known draining roller. Alternatively, the solution can be removed by applying the film to a plate and by using an air knife. The draining treatment can be used in the subsequent steps as well.

The dyeing process is not limited to the above-described impregnation. Alternatively, the polymer film can be stretched while being coated or sprayed with an aqueous solution containing a dichroic material. The method of stretching is not limited specifically, but the polymer film can be stretched while appropriately adjusting tensile force applied thereto.

(3) Crosslinking Treatment

The polymer film is pulled out from the dye bath, impregnated in a crosslinking bath containing a crosslinking agent, and further stretched in the crosslinking bath. The crosslinking treatment is performed to retain the running stability.

The crosslinking agent can be selected from known materials like boron-containing compounds such as boric acid, borax, glyoxal, and glutaraldehyde. These materials can be used alone or can be combined with at least one of any of the remaining materials. The solution for crosslinking bath can be prepared by dissolving the crosslinking agent in a solvent. For example, the solvent can be water, and it can further contain an organic solvent compatible with water.

Though the concentration of the crosslinking agent in the solution is not limited specifically, preferably, it ranges from 0.5 wt % to 10 wt %, more preferably from 2 wt % to 8 wt %, and particularly preferably from 3 wt % to 6 wt %.

In order to provide in-plane homogeneous properties to the polarizer, the solution containing a crosslinking agent can contain an auxiliary of iodide such as potassium iodide, lithium iodide, sodium iodide, zinc iodide, aluminum iodide, lead iodide, copper iodide, barium iodide, calcium iodide, tin iodide, and titanium iodide, in addition to the boric acid compound. The content of the auxiliary in the solution is, for example, from 0 wt % to 1.5 wt %, preferably from 0 wt % to 1.0 wt %, and more preferably, from 0 wt % to 0.7 wt %.

The temperature for the crosslinking bath generally ranges from 20° C. to 50° C. Though the time for impregnating the polymer film is not limited specifically, it generally ranges from 10 seconds to 2 minutes, preferably from 20 seconds to 1 minute.

As described above, the stretching during the crosslinking treatment can be carried out, for example, by impregnating the polymer film in the crosslinking bath. Alternatively, as described for the dyeing treatment, the polymer film in a relaxed state can be stretched while being coated or sprayed with the solution containing the crosslinking agent. The stretching process is not limited specifically. For example, tensile force applied to the film can be adjusted appropriately, or the film can be stretched at a fixed stretch ratio. These processes can be carried out more than once, or plural processes can be carried out. The tensile force can be adjusted appropriately corresponding to the kind of the crosslinking agent, the temperature of the crosslinking bath and the content of the crosslinking agent, the kind of the polymer film and an average degree of polymerization.

(4) Stretching Treatment

The polymer film is pulled out from the crosslinking bath, impregnated in a stretching bath, and further stretched in this stretching bath.

Though the solution for the stretching bath is not limited specifically, it is selected, for example, from solutions containing boric acid, various metal salts and other iodides, and zinc compounds. The solvent can be, water, ethanol, or the like.

A preferable range of the temperature of the stretching bath is for example from 30° C. to 75° C., more preferably from 40° C. to 70° C., and particularly preferably from 50° C. to 65° C.

(5) Washing Treatment

The polymer film is pulled out of the stretching bath, washed with water, and dried so as to produce a polarizer.

Though the number of washing cycles is not limited specifically, for example, it is 1–4, more preferably, 1–3, and particularly preferably, one or two.

The film can be subject to natural drying, air-drying, heating or the like without any specific limitations. In a case of heating, a preferable temperature range is from 10° C. to 50° C., more preferably from 20° C. to 45° C., and particularly preferably from 30° C. to 40° C.

Among these treatments, dyeing, stretching and crosslinking treatments can be carried out separately or simultaneously. A washing treatment can be included in each of the steps.

Although not limited specifically, the polarizer according to the present invention has a thickness of, for example, 5 μm to 80 μm. It is preferable that the thickness ranges from 10 μm to 60 μm, and more preferably, from 20 μm to 40 μm.

A polarizer can be used alone for a polarizing plate according to the present invention. Alternatively, a transparent protective layer can be provided on at least one surface of the polarizer.

For the polarizing plate, a single transmittance after being subjected to a luminosity correction is, for example, at least 45%. Use of such a polarizing plate is helpful in improving brightness in a display of an image display and its display quality. It is preferable in the polarizing plate that a single transmittance after being subjected to a luminosity correction is at least 45.5%, and more preferably, at least 46%. Furthermore, it is preferable that the polarizing plate has a polarization degree of at least 95%.

The transparent protective layer can be selected from known transparent films without any specific limitations. Preferably, it is a polymer film excellent in some characteristics such as transparency, mechanical strength, thermal stability, moisture shielding property, and isotropism. Specific examples of materials for the transparent protective layer include cellulose-based resins such as triacetylcellulose, and transparent resins based on e.g., polyester, polycarbonate, polyamide, polyimide, polyethersulfone, polysulfone, polystyrene, polynorbornene, polyolefin, acrylic substances, and acetate. Resins that will be cured by heat or ultraviolet rays, which is based on e.g., acrylic substances, urethane, acrylic urethane, epoxy, and silicones, can be used as well. Among them, a TAC film having a surface saponified with alkali or the like is preferred in light of the polarization property and durability.

Another example of a polymer film is described in JP 2001-343529 A(WO 01/37007). The polymer material used can contain a composition of a thermoplastic resin having a side chain including a substituted or unsubstituted imido group and a thermoplastic resin having a side chain including a phenyl group and a nitrile group, each of which is substituted or unsubstituted. An example is a resin composition containing an alternating copolymer of isobutene and N-methylene maleimide and an acrylonitrile-styrene copolymer. Alternatively, the polymer film can be formed by extruding the resin composition.

It is preferable that the protective layer is colorless. Specifically, it is preferable that a retardation value (Rth) of the film in thickness direction as represented by the following equation is in a range of −90 nm to +75 nm. More preferably, it is from −80 nm to +60 nm, and particularly preferably from −70 nm to +45 nm. When the retardation is within the range of −90 nm to +75 nm, coloring (optical coloring) of the polarizing plate, which is caused by the protective film, can be solved. In an equation of $Rth=\{[(nx+ny)/2]-nz\} \times d$, 'd' denotes a thickness of the protective layer, while nx, ny and nz respectively denote refractive indices of X-axis, Y-axis and Z-axis in the protective layer. In FIG. 1, the optical axis directions of the refractive indices (nx, ny, nz) in the protective layer is indicated specifically with arrows. As described above, the refractive indices nx, ny, and nz indicate respectively the refractive indices in the X-axis, Y-axis and Z-axis. The X axis denotes an axial direction presenting an in-plane maximum refractive index within the protective layer, the Y-axis denotes an in-plane axial direction perpendicular to the X-axis, and the Z-axis denotes a thickness direction perpendicular to the X-axis and the Y-axis.

The transparent protective layer can have an optically compensating function. Such a transparent protective layer having the optically compensating function can be a known layer used for preventing coloring or for widening a preferable visual angle that will be caused by changes in the visual angles, based on a phase difference. Specific examples include various films of the above-described transparent resins that is stretched uniaxially or biaxially, an oriented film of the liquid crystal polymer or the like, and a laminate having a transparent substrate and an oriented layer of e.g., a liquid crystal polymer. An oriented film of a liquid crystal polymer is advantageous especially since it can provide a wide visual angle with excellent visibility. Particularly advantageous is an optically compensating retardation plate including an optically compensating layer supported by a triacetylcellulose film, where the optically compensating layer is made of an incline-oriented layer of a discotic or nematic liquid crystal polymer. This optically compensating retardation plate is supplied, for example, as 'WV film' by Fuji Photo Film Co., Ltd or the like. Alternatively, the optically compensating retardation plate can be prepared by laminating two layers or more of the retardation film and a film supporter of triacetylcellulose film or the like so as to control the optical characteristics such as a phase difference.

The thickness of the transparent protective layer is not limited specifically but it can be determined appropriately depending on some factors such as the phase difference and protection strength. In general, the thickness is at most 500 µm, and advantageously, it is in a range of 5 µm to 300 µm and more advantageously it is in a range of 5 µm to 150 µm.

The transparent protective layer can be prepared appropriately according to any known methods such as coating of the transparent resin on the polarizer and laminating of e.g., the transparent resin film or the optically compensating retardation plate on the polarizer. Commercial products can be used as well.

A transparent protective film used for the protective layer can be treated to provide characteristics such as hard coating, antireflection, anti-sticking, diffusion and anti-glaring. Hard coating treatment is applied, for example, to prevent scratches on the surfaces of the polarizing plate. For example, a surface of the transparent protective film can be applied with a coating film of a cured resin with excellent hardness and smoothness. The cured resin can be selected from ultraviolet cured resins of silicone base, urethane base, acrylic, and epoxy base. The treatment can be carried out in a known method. Anti-sticking treatment is carried out for prevention of sticking with adjacent layers. Antireflection treatment may be applied to prevent reflection of external light on the surface of the polarizing plate, and carried out by forming such an anti-reflection film or the like in a known method.

A purpose of anti-glare treatment is to prevent reflection of external light on the polarizing plate surface from hindering visibility of light transmitted through the polarizing plate. The anti-glare treatment can be carried out by providing microscopic asperity on a surface of a transparent protective film in an appropriate manner, e.g., by roughening the surface by sand-blasting or embossing, or by forming the transparent protective layer by blending transparent particles in the above-described transparent resin.

The above-described transparent fine particles will be selected from silica, alumina, titania, zirconia, stannic oxide, indium oxide, cadmium oxide, antimony oxide or the like. Inorganic fine particles having electroconductivity can be used as well. Alternatively, the particles can be organic fine particles comprising, for example, crosslinked or uncrosslinked polymer particles. The average diameter of the transparent particles is, for example, from 0.5 µm to 50 µm, through there is no specific limitation. A preferable amount of the transparent fine particles is generally from 2 weight parts to 50 weight parts, for 100 weight parts of a transparent resin, and more preferably from 5 weight parts to 25 weight parts, though there is no specific limitation.

An anti-glare layer comprising transparent fine particles can be provided as the transparent protective layer or as a coating layer applied onto the transparent protective layer surface. The anti-glare layer can function as a diffusion layer to diffuse light transmitted through the polarizing plate in order to enlarge visual angles (i.e., visually-compensating function).

The above-mentioned layers such as the antireflection layer, the anti-sticking layer, the diffusion layer and the anti-glare layer can be laminated on the polarizing plate, as a sheet of optical layers comprising these layers, separately from the transparent protective layer.

The above-described polarizer can be bonded to the transparent protective layer in a known method without any specific limitations. In general, adhesives, including pressure-sensitive adhesives, can be used as described above, and the adhesive can be selected appropriately, e.g., depending on the type of polarizer and the type of transparent protective layer. The adhesive can be selected from polymeric adhesives based on acrylic substances, vinyl alcohol, silicone, polyester, polyurethane, polyether or the like, and rubber-based adhesives. Alternatively, the adhesive can contain a water-soluble crosslinking agents of vinyl alcohol-based polymers, such as boric acid, borax, glutaraldehyde, melamine, and oxalic acid; it can contain isocyanates based on isocyanates or urethanes. Epoxy-based adhesives, gelatin-containing adhesives, or adhesives containing at least formaldehyde, glutaraldehyde, melamine, oxalic acid or the like, can be used as well. These adhesives are difficult to peel off even under an influence of humidity or heat, and they are excellent in optical transparency and polarization degree. Specifically in the present invention, adhesives containing isocyanates or urethanes, or an epoxy-based adhesive, are preferred. For example, a PVA-based adhesive is preferably used for a polarizer of a PVA-based film in view of its adhesion stability.

Such an adhesive can be applied directly onto the surface of a polarizer or of a transparent protective layer. Alternatively, a layer of the adhesive formed as a tape or a sheet can be arranged on the surface, or a solution of the adhesive is coated and dried. When an additive is prepared as an aqueous solution, other additive(s) or catalyst(s) such as acid(s) can be blended as required.

In coating the adhesive, an additive or a catalyst such as an acid can be blended into the aqueous solution of the adhesive. Though the thickness of the adhesive layer is not limited specifically, for example, it ranges from 1 nm to 500 nm, preferably from 10 nm to 300 nm, and more preferably from 20 nm to 100 nm. Any known methods using adhesives or the like such as acrylic polymers and vinyl alcohol-based polymers can be used without any particular limitations. These adhesives can be applied, for example, by coating an aqueous solution thereof on a surface of a member and drying the coated solution. If required, other additive(s) or catalyst(s) such as an acid can be blended in the aqueous solution. Among them, a PVA-based adhesive is preferred from an aspect of the excellent adhesiveness with the PVA film.

The polarizing plate according to the present invention, which includes the polarizer and the protective layer according to the present invention, can be formed as an optical member including one or several additional optical layers or the like in use. Though there is no specific limitation on the optical layer, examples include optical layers used for forming liquid crystal displays or the like, i.e., a reflector, a transflector, a retardation plate such as a wavelength (λ) plate like a half wavelength plate and a quarter wavelength plate, and a viewing-angle compensating film. Particularly preferable optical member include a reflective polarizing plate or a semitransparent polarizing plate having either a reflector or a transflector laminated on the above-described polarizing plate; an elliptically polarizing plate or a circularly polarizing plate having a retardation plate laminated on the polarizing plate; a wide-viewing-angle polarizing plate having a viewing-angle compensating film laminated on the polarizing plate, and a polarizing plate on which a brightness enhancement film is laminated.

The reflective polarizing plate is formed by combining a polarizing plate and a reflective layer. This reflective polarizing plate is used in assembling a liquid crystal display, e.g., for reflecting incident light from the visible side (display side) so as to display. Since a built-in light source such as a backlight can be omitted, the liquid crystal display can be thinned further. The reflective polarizing plate can be produced by an appropriate method, for example, by attaching a reflective layer including a metal or the like on a surface of a polarizing plate via a transparent protective layer if required.

The reflective polarizing plate can be formed in any known manner such as forming a reflector of metal or the like on one surface of the polarizing plate. For example, a transparent protective film of the polarizing plate is prepared by matting one surface if required. On this surface, a foil comprising a reflective metal such as aluminum or a deposition film is applied to form a reflective polarizing plate. An additional example of a reflective polarizing plate comprises the above-mentioned transparent protective film having a surface with microscopic asperities due to the inclusion of fine particles, and also a reflector adapted to the microscopic asperities. The reflector having a surface with microscopic asperities diffuses incident light by irregular reflection so that directivity and glare can be prevented and irregularity in color tones can be controlled. This reflector can be formed by disposing a metal foil or a metal deposition film directly on a microscopic asperity surface of the transparent protective layer in any appropriate methods including deposition such as vacuum deposition, and plating such as ion plating and sputtering.

Alternatively, the reflector can be used as a reflecting sheet formed by providing a reflecting layer onto an appropriate film similar to the transparent protective film. Since a typical reflecting layer of a reflector contains a metal, it is preferable in use of the reflector that the reflecting surface of the reflecting layer is coated with a transparent protective film, a polarizing plate or the like in order to prevent the reflection rate from reduction due to oxidation. As a result, the initial reflection rate is maintained for a long period, and a separate protective layer can be omitted.

A semitransparent polarizing plate is provided by replacing the reflector in the above-mentioned reflective polarizing plate by a transflector, and it is exemplified by a half mirror that reflects and transmits light at the reflecting layer. In general such a semitransparent polarizing plate is arranged on a backside of a liquid crystal cell. In a liquid crystal display comprising the semitransparent polarizing plate, incident light from the visible side (display side) is reflected to display an image when the liquid crystal display is used in a relatively bright atmosphere, while in a relatively dark atmosphere, an image is displayed by using a built-in light source such as a backlight in the backside of the semitransparent polarizing plate. In other words, the semitransparent polarizing plate can be used to form a liquid crystal display that can save energy for a light source such as a backlight in a bright environment, while a built-in light source can be used in a relatively dark environment.

The following explanation is about an elliptically polarizing plate or a circularly polarizing plate formed by laminating a retardation plate on a polarizing plate composed of the above-mentioned polarizer and a protective layer.

The retardation plate is used for modifying linearly polarized light to either elliptically polarized light or circularly polarized light, modifying either elliptically polarized light or circularly polarized light to linearly polarized light, or modifying a polarization direction of linearly polarized light. For example, a retardation plate called a quarter wavelength plate ($\lambda/4$ plate) is used for modifying linearly polarized light to circularly polarized light, and for modifying circularly polarized light to linearly polarized light. A half wavelength plate ($\lambda/2$ plate) is used in general for modifying a polarization direction of linearly polarized light.

The above-described elliptically polarizing plate is effective in compensating (preventing) colors (for example, blue or yellow) generated due to birefringence in a liquid crystal layer of a super twist nematic (STN) liquid crystal display so as to provide a black-and-white display free of such colors. An elliptically polarizing plate with controlled three-dimensional refractive index is preferred further since it can compensate (prevent) colors that will be observed when looking at a screen of the liquid crystal display from an oblique direction. The circularly polarizing plate is effective in adjusting color tones of an image of a reflective liquid crystal display that has a color image display, and the polarizing plate serves to prevent reflection as well.

Examples of the retardation plates include birefringent films, oriented films of liquid crystal polymers, and laminates of oriented layers of liquid crystal polymers supported by the films. The birefringent films can be prepared by stretching films of any suitable polymers such as polycarbonate, polyvinyl alcohol, polystyrene, polymethyl methacrylate, polyolefins such as polypropylene or the like, polyarylate, and polyamide. The retardation plate may have a phase difference corresponding to the intended use, such as compensation of colors generated by birefringence of the respective wavelength plates and the liquid crystal layer and compensation of the viewing angle. Two or more kinds of retardation plates can be laminated for controlling the optical characteristics such as the phase difference.

The above-described elliptically polarizing plate and the reflective type elliptically polarizing plate are formed by laminating properly selected retardation plates and either a polarizing plate or a reflective polarizing plate. Alternatively, the elliptically polarizing plates can be formed by laminating them separately in a certain order in a process of producing a liquid crystal display so as to combine a (reflective) polarizing plate and a retardation plate. An optical member such as the above-described elliptically polarizing plate that is previously formed is excellent in stability in its quality and workability in lamination, and it provides the advantage of improving efficiency in producing a liquid crystal display.

The following description is about a wide-viewing-angle polarizing plate formed by further laminating a viewing-angle compensating film on the above-described polarizing plate including a polarizer and a protective layer.

The viewing-angle compensating film is used for widening a visual angle so that an image can be clear relatively when a screen of a liquid crystal display is seen not in a direction perpendicular to the screen but in a slightly oblique direction.

Such a viewing-angle compensating film can include, for example, a retardation film, an oriented film of a liquid crystal polymer, and the oriented film supported by a transparent substrate. While an ordinary retardation plate is a birefringent polymer film that is stretched uniaxially in the face direction, a retardation plate used for an viewing-angle compensating film is a two-way stretched film such as a birefringent polymer film stretched biaxially in the face direction, a polymer film with controlled birefringence in the thickness direction that is stretched uniaxially in the face direction and stretched also in the thickness direction, and an incline-oriented polymer film. The incline-oriented film is prepared by, for example, bonding a heat shrinkable film to a polymer film and stretching and/or shrinking the polymer film under an influence of a shrinkage force provided by heat, or by orienting obliquely a liquid crystal polymer. A polymer used as a material of the retardation plate is similar to the polymer used for the above-mentioned retardation plate. The polymer can be selected appropriately for preventing coloring or the like caused by a change in the viewing angle based on a phase difference depending on the liquid crystal cells or for enlarging a viewing angle with excellent visibility.

From an aspect of achieving a wide viewing angle with excellent visibility, an optically compensating retardation plate prepared by supporting an optically anisotropic layer containing an oriented layer of a liquid crystal polymer, and particularly containing an incline-oriented layer of a discotic liquid crystal polymer, with a triacetylcellulose film, is used preferably.

A polarizing plate described below includes further a brightness enhancement film laminated on the polarizing plate comprising a polarizer and a protective layer.

Generally, this polarizing plate that is prepared by bonding a brightness enhancement film on a polarizing plate is arranged on a backside of a liquid crystal cell. When natural light enters, by reflection from a backlight or a backside of a liquid crystal display etc., the brightness enhancement film reflects linearly polarized light of a predetermined polarizing axis or circularly polarized light in a predetermined direction while the same film transmits other light. The above-mentioned polarizing plate allows entrance of light from a light source such as a backlight so as to obtain transmitted light in a predetermined polarization state, while reflecting light other than light in the predetermined polarization state. Light that is reflected at this brightness enhancement film is reversed through a reflector or the like arranged additionally behind the brightness enhancement film. The reversed light that re-enters the brightness enhancement film is transmitted partly or entirely as light in a predetermined polarization state, so that light transmitting the brightness enhancement film is increased and polarized light that is hardly absorbed in the polarizer is supplied. As a result, the quantity of light available for the liquid crystal display or the like can be increased to enhance brightness. When light enters through a polarizer from the backside of a liquid crystal cell by using a backlight or the like without using any brightness enhancement films, most light is absorbed in the polarizer and not transmitted by the polarizer if the light has a polarization direction inconsistent with the polarization axis of the polarizer. Depending on characteristics of the polarizer, about 50% of light is absorbed in the polarizer, and this decreases the quantity of light available in the liquid crystal display or the like and makes the image dark.

The brightness enhancement film repeatedly prevents light having a polarization direction to be absorbed in the polarizer from entering the polarizer, and reflects the light on the brightness enhancement film, reverses the light through a reflecting layer or the like arranged behind, and makes the light re-enter the brightness enhancement plate. Since the polarized light that is reflected and reversed between them is transmitted through the brightness enhancement film to supply to the polarizer only if the light has a polarization direction to pass the polarizer, light from a backlight or the like can be used efficiently for displaying images of a liquid crystal display in order to provide a bright screen. The brightness enhancement film is advantageously selected from a multilayer thin film of a dielectric or a multilayer lamination of thin films with varied refraction anisotropy that transmits linearly polarized light having a predetermined polarization axis while reflecting other light, and a cholesteric liquid crystal layer, more specifically, an oriented film of a cholesteric liquid crystal polymer or an oriented liquid crystal layer fixed onto a film substrate that reflects either clockwise or counterclockwise circularly polarized light while transmitting other light.

Therefore, for a brightness enhancement film to transmit linearly polarized light having a predetermined polarization axis, the transmission light enters the polarizing plate by matching the polarization axis so that absorption loss due to the polarizing plate is controlled and the light can be transmitted efficiently. For a brightness enhancement film to transmit circularly polarized light such as a cholesteric liquid crystal layer, the circularly polarized light is converted to linearly polarized light before entering the polarizing plate in an aspect of suppression of the absorption loss, though the circularly polarized light can enter the polarizer directly. Circularly polarized light can be converted to linearly polarized light by using a quarter wavelength plate for a retardation plate.

A retardation plate functioning as a quarter wavelength plate in a wide wavelength range including a visible light region can be obtained, for example, by overlapping a retardation layer functioning as a quarter wavelength plate for monochromatic light such as light having 550 nm wavelength and another retardation plate showing a separate optical retardation property (e.g., a retardation plate functioning as a half wavelength plate). Therefore, a retardation plate arranged between a polarizing plate and a brightness enhancement film can comprise a singe or more layers of retardation layers.

A cholesteric liquid crystal layer can also be provided by combining layers having different reflection wavelengths, and it can be configured by overlapping two or more layers. As a result, the obtained retardation plate can reflect circularly polarized light in a wide wavelength range including a visible light region, and this can ensure transmission of circularly polarized light in a wide wavelength range.

Like the above-described polarized-light separation type polarizing plate, a polarizing plate according to the present invention can include a laminate of the polarizing plate and at least two optical layers. In other words, the polarizing plate can be a reflective polarizing plate or a semitransparent polarizing plate for elliptically polarized light, which is prepared by combining either the above-mentioned reflective polarizing plate or a semitransparent polarizing plate with a retardation plate. An optical member comprising a laminate of at least two optical layers can be formed by a method of laminating layers separately in a certain order for manufacturing a liquid crystal display or the like. Since an optical member that has been laminated previously has excellent stability in quality and assembling operability, efficiency in manufacturing a liquid crystal display can be improved. Any appropriate adhesives such as a pressure-sensitive adhesive layer can be used for laminating the polarizing plate and optical layers. When adhering the polarizing plate and any other optical members, the optical axes can be arranged with appropriate angles corresponding to the target retardation properties or the like.

The above-described polarizing plate and the optical members can be provided with a pressure-sensitive adhesive layer for bonding with other members such as a liquid crystal cell. Though there is no specific limitation, the pressure-sensitive adhesive used for forming the pressure-sensitive adhesive layer may be selected suitably from polymers such as acrylic polymers, silicone-based polymers, or polymers containing base polymers such as polyester, polyurethane, polyamide, polyether, fluororesins and rubbers. An acrylic pressure-sensitive adhesive is particularly preferable, since such an adhesive is excellent in the optical transparency, and provides proper wettability, cohesiveness, pressure-sensitive adhesiveness, and excellent weather resistance and heat resistance.

Furthermore, a pressure-sensitive adhesive layer having a low moisture absorption coefficient and an excellent heat resistance are preferred from an aspect of preventing foaming or peeling caused by moisture absorption or preventing degradation in the optical properties and warping of a liquid crystal cell caused by difference in thermal expansion coefficients, resulting in formation of a liquid crystal display of high quality and excellent durability.

The pressure-sensitive adhesive layer may contain known additives such as a filler including one or more of natural or synthetic resins (especially, sticky resins), glass fibers, glass beads, metal powder, or any other inorganic powders; a pigment; a coloring agent; and an antioxidant. The pressure-sensitive adhesive layer may contain fine particles to provide light-diffusion property.

The pressure-sensitive adhesive layers may be arranged on at least one surface of the polarizing plate or of the optical element by a suitable method. For example, a solution comprising a pressure-sensitive adhesive of about 10–40 weight % is prepared by dissolving or dispersing the pressure-sensitive adhesive or the composition thereof in a suitable solvent comprising toluene or ethyl acetate used alone, a mixture thereof, or the like. The solution is provided directly onto an optical element by any suitable developing methods such as casting or coating. Otherwise, a pressure-sensitive adhesive layer can be formed on a separator by the above-mentioned manner and transferred onto the optical element.

The pressure-sensitive adhesive layer as a laminate of layers different in components or kinds can be disposed on at least one surface of the polarizing plate or the optical member. The laminate can include monolayers different from each other in type or in composition. When disposed on both surfaces of the polarizing plate, the pressure-sensitive adhesive layers can be the same or can be different. The thickness of the pressure-sensitive adhesive layer can be determined appropriately depending on the purpose of use or the adhesive strength. In general, it is from 1 μm to 500 μm, preferably from 5 μm to 200 μm, particularly preferably from 10 μm to 100 μm.

When a surface of a pressure-sensitive adhesive layer on a surface of the polarizing plate is exposed, preferably, the adhesive layer is covered with a separator until the time the pressure-sensitive adhesive layer is used so that contamination will be prevented. The separator can be selected appropriately from conventional ones, as long as it satisfies the above-described thickness requirement. Examples of the separator are plastic films, rubber sheets, paper, cloths, nonwoven fabrics, nets, foamed sheets, metal foils, and laminates thereof, which can be coated with a suitable peeling agent as required. The peeling agent may be selected, for example, from a silicone-based agent, a long-chain alkyl-based agent, a fluorine-based agent, an agent comprising molybdenum sulfide or the like.

The above-described members composing the polarizing plate and the optical member, such as a polarizer, a transparent protective film, a pressure-sensitive adhesive layer, can have ultraviolet absorption power as a result of treatment with an ultraviolet absorber such as an salicylate compound, a benzophenol compound, a benzotriazole compound, a cyanoacrylate compound, and a nickel complex salt compound.

The polarizing plates of the present invention can be used preferably for producing various devices such as liquid crystal displays. In other words, the present invention provides a liquid crystal display including a liquid crystal panel and the above-described polarizer. Furthermore, the present invention provides a liquid crystal display including a liquid crystal panel and the above-described polarizing plate.

The liquid crystal display may be formed in a conventional method. That is, the liquid crystal display may be formed in general by assembling components such as a liquid crystal panel, a polarizing plate and an optically compensating retardation plate, and also an illuminating system as required, in a suitable manner and further assembling a driving circuit. There is no specific limitation in the method as long as the polarizer or the polarizing plate of the present invention is used. For the liquid crystal panel, any types of panels such as TN type, STN type and π type may be used arbitrarily.

Accordingly, a liquid crystal display according to the present invention can include either a polarizer or a polarizing plate arranged on at least one surface of a liquid crystal panel, or it uses a backlight or a reflector for the lighting system. In that case, the polarizer or the polarizing plate according to the present invention can be provided on at least one surface of the liquid crystal panel.

The liquid crystal panel for forming a liquid crystal display can be selected arbitrarily. Specifically for example, it can be selected from various kinds of liquid crystal cells such as active matrix drive represented by a thin film transistor type, and a simple matrix drive such as a twisted nematic type and a super twisted nematic type. Since the optical films and polarizing plates according to the present invention are excellent particularly in optical compensation of a VA (Vertical Aligned) cell, they are used particularly preferably for viewing-angle compensating films for VA mode liquid crystal displays.

A typical liquid crystal panel is composed of opposing liquid crystal cell substrates and a liquid crystal injected into a space between the substrates. The liquid crystal cell substrates can be made of glass, plastics or the like without any specific limitations. Materials for the plastic substrates can be selected from conventionally known materials without any specific limitations.

When polarizing plates or optical members are arranged on both surfaces of a liquid crystal panel, the polarizing plates or the optical members on the surfaces can be the same or different type. Moreover, for forming a liquid crystal display, one or more layers of appropriate members such as a prism array sheet, a lens array sheet, an optical diffuser and a backlight can be arranged at proper positions.

The liquid crystal display according to the present invention is not limited specifically as long as it includes a liquid crystal panel and uses a polarizer or a polarizing plate of the present invention. When it includes further a light source, preferably, the light source is a flat light source emitting polarized light for enabling effective use of optical energy, though there is no specific limitation thereon.

The liquid crystal display according to the present invention can include further at least one additional member on any proper position on the visible side polarizing plate. The member can be selected from, for example, a diffusion plate, an anti-glare layer, an antireflection film, a protective layer, a protective plate, a prism array sheet, a lens array sheet, a light-diffusion layer, and a backlight. Alternatively, a compensating retardation plate or the like can be disposed suitably between the liquid crystal cell and the polarizing plate in the liquid crystal panel.

A liquid crystal display including preferably a polarizer or a polarizing plate according to the present invention is described below. Such a liquid crystal display includes a light source, an optical controlling layer, and a liquid crystal panel. The light source is disposed on at least one side face of the liquid crystal panel so as to illuminate the interior of the liquid crystal display, and the optical controlling layer for reflecting light transmitted though the interior of the liquid crystal display is arranged on at least one surface of the liquid crystal panel. Any liquid crystal displays of conventional structures can be applied with the polarizer or the polarizing plate according to the present invention.

The light source is not limited specifically as long as it can illuminate the interior of the liquid crystal display. For example, it can be a point light source, a linear light source, a cold cathode ray tube, a LED or the like.

Materials for the optical controlling layer are not limited specifically but they can be, for example, ultraviolet-curable resin and monomer, or thermoplastic resin. A base film can be used for this purpose, and the film will be peeled off later. An adhesive, specifically, a pressure-sensitive adhesive or the like can be coated or transferred onto a surface opposing the light reflector, if required.

A method for producing the optical controlling layer is not limited specifically. For example, a previously-shaped cast is pressed onto a transparent film in order to transfer the shape of the cast; an ultraviolet-curable resin is coated on a cast, cured and peeled off; and, an ultraviolet-curable resin is coated on a film and then the film is pressed on a resin-coated surface of a cast, irradiated with an ultraviolet ray in order to cure and peel the resin off from the cast. The ultraviolet-curable resin described here as an example can be replaced by an ultraviolet-polymeric monomer, or a resin that is cured by radiations such as an electron beam.

The optical controlling layer according to the present invention is extremely thin in comparison with light-guiding plates used in backlights and front light system of conventional liquid crystal displays, thereby thickness of the liquid crystal display can be decreased. Specifically, the thickness of the optical controlling layer is 200 μm or less, and advantageously, it is 100 μm or less. As a result, the thickness can be decreased considerably in comparison with a conventional backlight or a front light system having a thickness of 2 mm or more.

The optical controlling layer can have a plurality of light reflectors on the surface. The light reflectors are composed of, for example, depressions with inclined surfaces. When a light beam transmitted through the interior of the liquid crystal display enters each of the depressed light reflector of the optical controlling layer, the light beam can be reflected into the interior of the liquid crystal display depending on the angle of the inclined surface. Thereby, the light reflector prevents the transmitted light in the liquid crystal display from outgoing and helps the light beam to be transmitted through the interior of the liquid crystal display.

It is advantageous that a light-source reflector is provided around the light source of the present invention, i.e., the light-source reflector is provided in a close contact with the side face of the panel so as to surround the light source. Accordingly, light from the light source can enter the liquid crystal panel efficiently so as to increase the luminosity. The light-source reflector can be a reflective film suitably formed from a metal thin film with improved reflectivity. Alternatively, it can be a white film, a metal plate, or a resin product.

The present invention provides a liquid crystal display having a liquid crystal panel and the above-described polarizer, a light source for illuminating the interior of the liquid crystal display, and an optical controlling layer for reflecting light transmitted through the interior of the liquid crystal panel, wherein the light source is arranged on at least one side face of the liquid crystal panel, the optical controlling layer is arranged on at least one surface of the liquid crystal panel, and the polarizer is located between the liquid crystal panel and the optical controlling layer.

The polarizer in the liquid crystal display can be replaced by a polarizing plate of the present invention.

The liquid crystal display according to the present invention can include further a retardation plate, and the retardation plate is located between the polarizer and the liquid crystal panel.

Alternatively, the liquid crystal display according to the present invention can include a polarizing plate in place of the polarizer, and the retardation plate is located between the polarizing plate and the liquid crystal panel.

Figure 2:
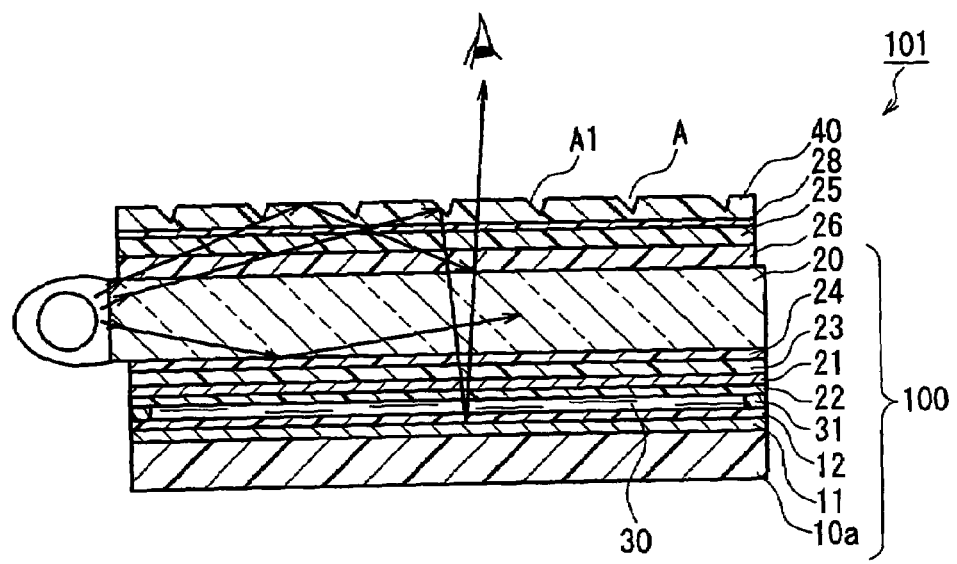
FIG. 2 is a schematic cross-sectional view showing a structural example of a reflective liquid crystal display according to the present invention.

FIG. 2 is a cross-sectional view showing an example of a reflective liquid crystal display according to the present invention. As illustrated in FIG. 2, this liquid crystal display 101 includes a liquid crystal panel 100, a light source 51, and an optical controlling layer 40.

The light source 51 is disposed on a side face of the liquid crystal panel 100 (on the left side in FIG. 2). The light source 51 is covered by a light-source reflector 52 except at a portion where the light-source reflector 52 is contacted with the side face of the liquid crystal panel 100.

The liquid crystal panel 100 includes an upper transparent substrate 20, a lower substrate 10a, and a liquid crystal layer 30. On a surface of the upper transparent substrate 20, a low-refractive layer 24, a color filter 23, a transparent electrode 21 and a rubbing film 22 are laminated in this order. These elements are arranged in a line with one end face of the upper transparent substrate 20. A reflective electrode 11 and a rubbing film 12 are disposed in this order on the lower substrate 10a. These elements are aligned on both end faces with the lower substrate 10a. The rubbing film 22 of the upper transparent substrate 20 and the rubbing film 12 of the lower substrate 10a are arranged facing with each other. The peripheries of the facing surfaces of the two substrates are sealed with a sealing material 31 except a predetermined part. A liquid crystal is injected into a space formed by the sealing material 31, the upper transparent substrate 20 and the lower substrate 10a, thereby forming the liquid crystal layer 30. All layers composing the liquid crystal panel, except for the upper transparent substrate 20, are aligned at the both ends. The upper transparent substrate 20 is aligned with the other layers at one end, while the other end (the left side in FIG. 2) protrudes.

The optical controlling layer 40 is laminated on a surface of the upper transparent substrate 20 of the liquid crystal panel 100. Between the optical controlling layer 40 and the upper transparent substrate 20, a retardation plate 26, a polarizing plate 25 and an adhesive layer 28 are arranged in this order when viewed from the upper transparent substrate 20. The surface of the optical controlling layer 40 is provided with light reflectors A, and each of the light reflectors A has a plurality of inclined surfaces A1. The inclined surfaces A1 form a substantial inequilateral triangle in the cross section. The optical controlling layer 40, the retardation plate 26, the polarizing plate 25 and the adhesive layer 28 are laminated with both end faces aligned. However, since the surface area of the upper transparent substrate 20 is larger an any of the optical controlling layer 40, the retardation plate 26, the polarizing plate 25 and the adhesive layer 28, the upper transparent substrate 20 is not aligned with the other elements at one end face even when the other end faces are aligned.

Most of the light emitted from the light source 51 is allowed by the light-source reflector 52 to enter the upper transparent substrate 20 on the basis of the ratio in thickness. Based on the law of reflection, the incident light is transmitted through the interior of the liquid crystal display 101 while being reflected totally.

The low-refractive layer 24 has a substantially small refractive index in comparison with any of the optical controlling layer 40, the adhesive layer 28 and the upper transparent substrate 20. Therefore, during a transmission of light in the interior of the liquid crystal display 101, the low-refractive layer 24 reflects the transmitted light at the interface between the upper transparent substrate 20 and the low-refractive layer 24. Thereby, the light will not reach the color filter 23 or the liquid crystal layer 30, and thus, loss of the light can be prevented. Furthermore, when the low-reactive layer 24 has a sufficient thickness, the transmitted light can be reflected totally at the interface between the upper transparent substrate 20 and the low-refractive layer 24.

The light transmitted through the interior of the upper transparent substrate 20 will pass through the retardation plate 26, the polarizing plate 25 and the adhesive layer 28 so as to reach the optical controlling layer 40, when a difference between the refractive index of the optical controlling layer 40 and those of the adhesive layer 28 and the upper transparent substrate 20 is small, or when both the optical controlling layer 40 and the adhesive layer 28 have high refractive indices. When a light beam enters an inclined surface A1 of the light reflector A formed on the optical controlling layer 40, the light beam is reflected according to the inclination angle of the inclined surface A1, and outgoes towards the upper transparent substrate 20 without passing through the optical controlling layer 40. More specifically, a light beam emitted from the light source 51 and entering the upper transparent substrate 20 is reflected totally on the interface between the optical controlling layer 40 and air on one hand, and on the interface between the low-refractive layer 24 and the upper transparent substrate 20 on the other hand, thereby reaching a side face (the right side face in FIG. 2) of the upper transparent substrate 20 opposing the side face provided with the light source 51.

Even if a light beam emitted from the light source 51 passes at least once through the liquid crystal display 101 provided with the polarizing plate 25 of the present invention, color of the light outgoing through another side face (the right side face in FIG. 2) of the upper transparent substrate 20 can be suppressed.

Figure 3:
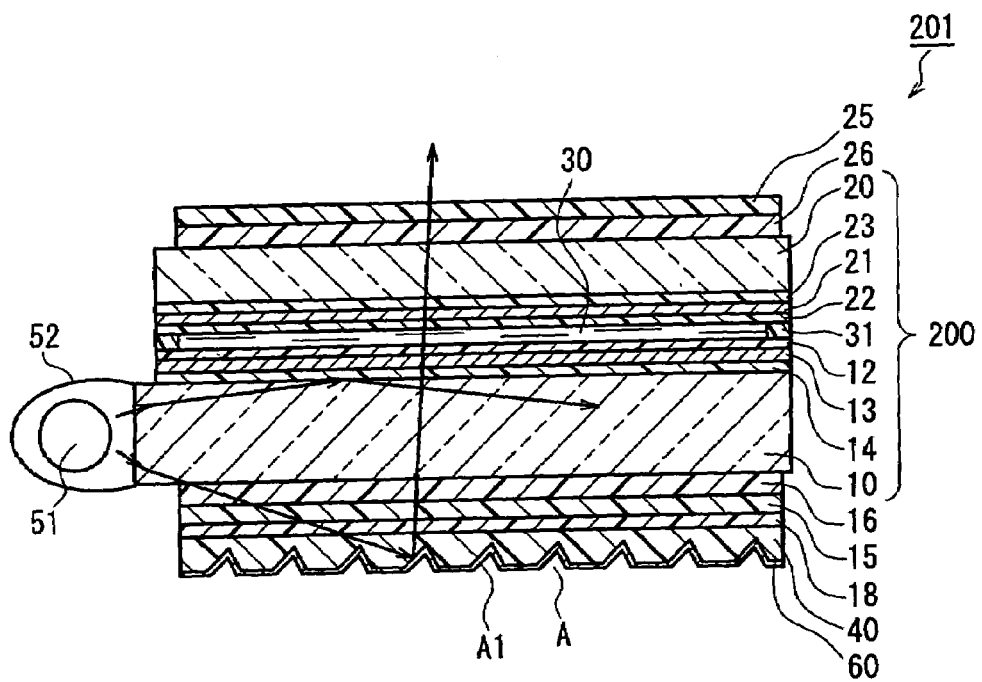
FIG. 3 is a schematic cross-sectional view showing a structural example of a semitransparent-reflective liquid crystal display according to the present invention.

FIG. 3 is a cross-sectional view showing an example of a reflective liquid crystal display according to the present invention. As illustrated in FIG. 3, this liquid crystal display 201 includes a liquid crystal panel 200, a light source 51, and an optical controlling layer 40.

A light source 51 is disposed on a side face of the liquid crystal panel 200 (on the left side in FIG. 3). The light source 51 is covered by a light-source reflector 52 except at a portion where the light-source reflector 52 is contacted with the side face of the liquid crystal panel 200.

The liquid crystal panel 200 includes an upper transparent substrate 20, a lower transparent substrate 10, and a liquid crystal layer 30. On a surface of the upper transparent substrate 20, a color filter 23, a transparent electrode 21 and a rubbing film 22 are laminated in this order. These elements are aligned on both end faces with the upper transparent substrate 20. A low-refractive layer 14, a semitransparent reflective electrode 13 and a rubbing film 12 are laminated in this order on the lower transparent substrate 10. These elements are aligned on one end face with the lower transparent substrate 10. The rubbing film 22 of the upper transparent substrate 20 and the rubbing film 12 of the lower transparent substrate 10 are arranged facing with each other. The peripheries of the facing surfaces of the two substrates are sealed with a sealing material 31 except a predetermined part. A liquid crystal is injected into a space formed by the sealing material 31, the upper transparent substrate 20 and the lower transparent substrate 10, thereby forming the liquid crystal layer 30. All layers composing the liquid crystal panel, except for the lower transparent substrate 10, are aligned on the both ends. The lower transparent substrate 10 is aligned with the other layers on one end, while the other end (the left side face in FIG. 3) protrudes.

The optical controlling layer 40 is laminated on a surface of the lower transparent substrate 10 of the liquid crystal panel 200. Between the optical controlling layer 40 and the lower transparent substrate 10, a retardation plate 16, a polarizing plate 15 and an adhesive layer 18 are arranged in this order when viewed from the lower transparent substrate 10. The surface of the optical controlling layer 40 is provided with a reflective layer 60 and light reflectors A, and each of the light reflectors A has a plurality of inclined surfaces A1. The inclined surfaces A1 form a substantial inequilateral triangle in the cross section. The optical controlling layer 40, the retardation plate 16, the polarizing plate 15 and the adhesive layer 18 are laminated with both end faces aligned. However, since the surface area of the lower transparent substrate 10 is larger than any of the optical controlling layer 40, the retardation plate 16, the polarizing plate 15 and the adhesive layer 18, the lower transparent substrate 10 is not aligned with the other elements on one end face even when the other end faces are aligned.

Most of the light emitted from the light source 51 is allowed by the light-source reflector 52 to enter the lower transparent substrate 10 on the basis of the ratio in thickness. Based on the law of reflection, the incident light passes through the interior of the liquid crystal display 201 while being reflected totally.

The low-refractive layer 14 has a sufficiently small refractive index in comparison with any of the optical controlling layer 40, the adhesive layer 18 and the lower transparent substrate 10. Therefore, during a transmission of light through the interior of the liquid crystal display 201, the low-refractive layer 14 reflects the transmitted light at the interface between the lower transparent substrate 10 and the low-refractive layer 14. Thereby, the light will not reach the color filter 23 or the liquid crystal layer 30, and thus, loss of the light can be prevented. Furthermore, when the low-refractive layer 14 has a sufficient thickness, the transmitted light can be reflected totally at the interface between the lower transparent substrate 10 and the low-refractive layer 14.

The light transmitted through the interior of the lower transparent substrate 10 will pass through the retardation plate 16, the polarizing plate 15 and the adhesive layer 18 so as to reach the optical controlling layer 40, when the optical controlling layer 40, the adhesive layer 18 and the lower transparent substrate 10 combined here are in a relationship such that differences in the refractive indices between the lower transparent substrate 10 and the optical controlling layer 40 and also between the lower transparent substrate 10 and the adhesive layer 18 are small, or when both the optical controlling layer 40 and the adhesive layer 18 combined here have high refractive indices. When a light beam enters an inclined surface A1 of the light reflector A formed on the optical controlling layer 40, the light beam is reflected according to the inclination angle of the inclined surface A1, and outgoes towards the lower transparent substrate 10 without passing through the optical controlling layer 40. More specifically, a light beam emitted from the light source 51 and entering the lower transparent substrate 10 is reflected totally at the interface between the optical controlling layer 40 and air on the one hand, and at the interface between the low-refractive layer 14 and the lower transparent substrate 10 on the other hand, thereby reaching a side face (the right side face in FIG. 3) of the lower transparent substrate 10 opposing the side face provided with the light source 51.

Even if a light beam emitted from the light source 51 passes at least once through the liquid crystal display 201 provided with the polarizing plate 15 of the present invention, coloring of the light outgoing through another side face (the right side face in FIG. 3) of the lower transparent substrate 10 can be suppressed.

Figure 4:
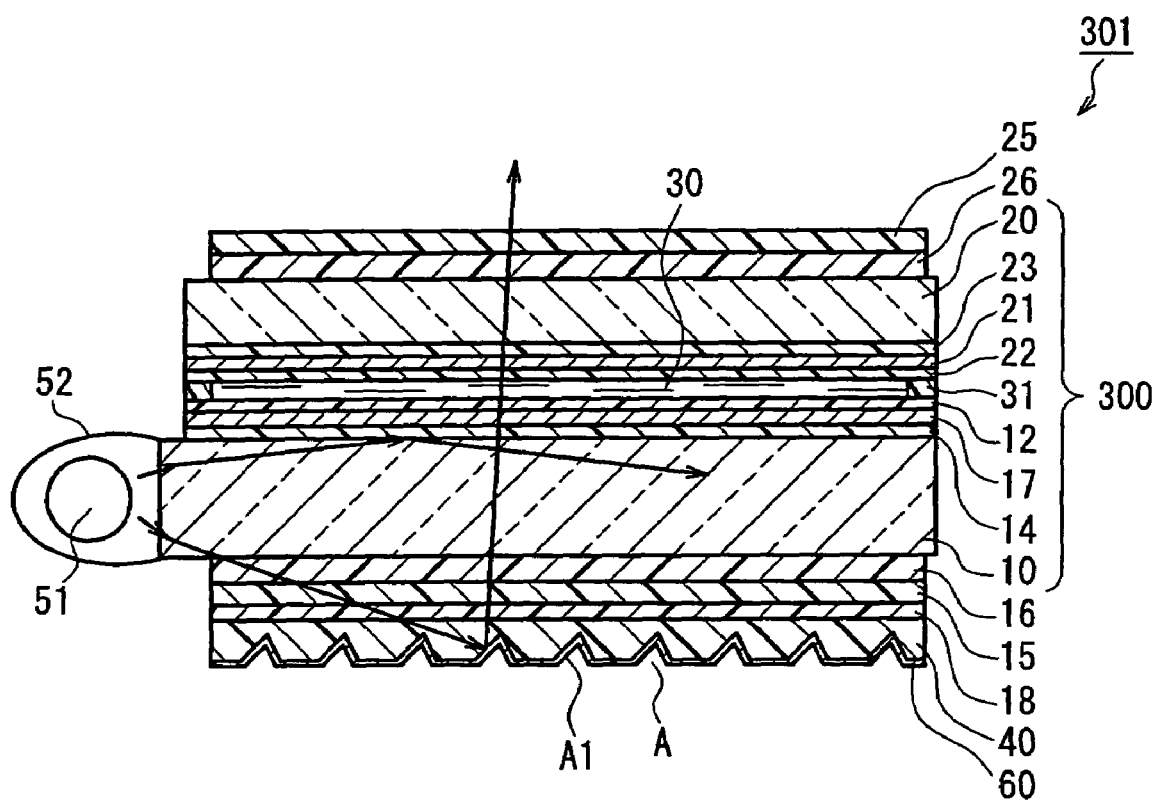
FIG. 4 is a schematic cross-sectional view showing a structural example of a transmission liquid crystal display according to the present invention.

FIG. 4 is a cross-sectional view showing an example of a transmission liquid crystal display according to the present invention. As illustrated, a liquid crystal panel 300 and a transmission liquid crystal display 301 are configured similarly to the liquid crystal panel 200 and liquid crystal display 201 shown in FIG. 3, except that the semitransparent-reflective electrode 13 is replaced by a transparent electrode 17.

A light beam emitted from the light source 51 is transmitted through the interior of the liquid crystal display 301 similarly to the case of the semitransparent liquid crystal display 201. A light beam emitted from the light source 51 passes more than once through the liquid crystal display 301 provided with the polarizing plate 15 of the present invention. Still, coloring of the light beam outgoing from the other side face of the lower transparent substrate 10 (the right side face in FIG. 4) can be suppressed.

The light reflectors A in each of FIGS. 2–4 are not in the shape of the face continued in the longitudinal direction but the light reflectors A are composed of concavities having predetermined length, depth and width. Light reflectors composed of concavities each having a length of 5 times their depth can reflect light efficiently. In FIGS. 2–4, a length of the light reflector A denotes a size in the longitudinal direction, a depth denotes a size in the vertical direction, and a width denotes a size in a direction perpendicular to the length and depth. It is preferable that the length of the light reflector is not more than 500 μm from an aspect of uniform light emission.

When each of the light reflectors A is composed of a concave/convex prism having inclined surfaces of an angle ranging from 35° to 48° and the inclined surfaces facing the light source, light beams transmitted through the interior of the liquid crystal panel can be directed to the liquid crystal panel as a result of reflection on the inclined surfaces of the light reflector A. Thereby, light beams useful in display can be transmitted further so as to provide a bright and excellent display. Especially, when the angle of the inclined surfaces is within the above-described range, the transmitted light is reflected totally according to the refractive index of the inclined surfaces of the light reflector A, and thus, the light can be observed visually with an extreme efficiency.

When at least each of the inclined surfaces facing the light source has an angle of 35° or more with respect to the liquid crystal panel surface, a light beam is reflected at an angle of 30° or less at the time of illumination of the liquid crystal panel. This is preferred since the light is directed towards the observer. When the inclined surfaces facing the light source have an angle of 48° or less with respect to the liquid crystal panel surface, the light is reflected totally. This is preferred since leakage of light from the inclined surfaces can be prevented.

The angle of the inclined surfaces of the light reflector has a relationship with the refractive index of the light reflector. It is preferable that the angle is from 38° to 45°, and more preferably, from 40° to 44°. Thereby, the emitted light can be directed perpendicularly, i.e., the emission is directed to the observer more efficiently so as to decrease the loss of the light, and thus light can be emitted efficiently.

From an aspect of the excoriation resistance, it is preferable that each prism is a concave having a cross section of substantially a triangle.

When light sources are provided on plural side faces of a liquid crystal panel, the inclined surfaces of the respective light reflector can be directed to any one of the light sources. When light sources are provided to face each other sandwiching the liquid crystal panel, inclined surfaces in each light reflector can face the respective light sources. At that time, each of the light reflector can be shaped as substantially a triangle, substantially a rectangle, or substantially a pentagon in cross-section.

It is preferable that an optical controlling layer having the light reflector is composed of a plane having an angle of at most 5° or preferably 0° with respect to the liquid crystal panel surface, and/or an inclined surface opposing the light source and having an angle of at least 35° with respect to the liquid crystal panel surface, except for either the light reflector or the inclined surfaces of the light reflector facing the light source. Accordingly, most of the optical controlling layer can be formed as a plane having an angle of at most 35°. As a result, a light beam can be transmitted efficiently apart from the light source through the interior of the liquid crystal display, providing uniform emission of light.

It is preferable that the variation in angles of planes located between two adjacent light reflectors is small, so that disturbance in its display can be decreased. Preferably, the variations in the angles among the adjacent planes is at most 1°, more preferably, at most 0.5°.

Here, a LCD has an optical controlling layer having light reflectors formed as fine prism concavities each having a substantially triangular cross section in the depth/width direction, and, each concavity being defined in the length, depth and width, the length is at least five times the depth. By arranging the fine prism concavities randomly and with a high density at the light incident portion, the opposite portion, or around the side faces, moirés occurring in the space between each pixel and each concavity can be prevented, and thus a more uniform image display is realized.

When the light reflectors are formed as discontinuous and substantially in the shape of triangles in cross section, it is preferable that a plane facing the inclined surface of each light reflector is smaller when viewed from above, from an aspect of the light transmittance in a reflection mode. For this purpose, it is preferable that the angle with respect to the liquid crystal panel is bigger, specifically, at least 50°, preferably, at least 60°, and more preferably, at least 75°.

Furthermore, a reflective layer or an anti-glare layer can be formed on the surface of the light reflector of the optical controlling layer, as long as the performance of the light reflector is not hindered. The reflective layer functions to reflect external light in order to display without turning on the light source. The reflective layer is made of aluminum, silver, or the like by deposition or sputtering.

A low-refractive layer is arranged on a surface of the liquid crystal panel. Preferably, it is arranged on a surface having no optical controlling layer. It is more preferable that the low-refractive layer is arranged between an upper/lower transparent substrate and a liquid crystal layer composing a liquid crystal panel, in which a light source is arranged on a side face of the laminate including the transparent substrate and the liquid crystal layer. The thus formed low-refractive layer can reflect light directed to the liquid crystal layer, which is emitted from the light source and transmitted through the interior of the liquid crystal display, at the interface between the low-refractive layer and the substrate, due to total reflection based on a difference in the refractive index with respect to the low-refractive layer. Therefore, the light transmitted through the interior of the liquid crystal display is substantially free of influences of birefringence or dispersion caused by the liquid crystal layer, or optical absorption caused by a color filter or the like provided in the vicinity of the liquid crystal layer, and thus, the light can be transmitted effectively. This can prevent a rapid decrease of transmitted light, which is caused by optical absorption by a color filter or the like, birefringence based on a liquid crystal display layer, or a decrease or nonuniformity of transmitted light caused by alteration in the light dispersion. This can prevent a decrease in brightness of a liquid crystal display or a ghost phenomenon that can affect a part of a liquid crystal panel located far from the light source.

Such a low-refractive layer has substantially no influence on external light entering in a reflection mode. For example, even when the low-refractive layer has a refractive index difference of 0.1 with respect to a transparent substrate having a light source provided on a side face thereof, a reflectance on the interface between the transparent substrate and the low-refractive layer is as low as about 0.1%. As a result, deterioration in brightness or contrast of the image display, which is caused by reflection and loss of the external light, will not occur.

Reflection on the interface between the low-refractive layer and the transparent substrate is increased when the refractive index of the low-refractive layer is smaller than that of the transparent substrate. The difference in the refractive index is, for example, at least 0.05, preferably, at least 0.1.

There is no specific limitation on materials and methods for producing the low-refractive layer. For example, a low-refractive layer is produced by forming an inorganic/organic low-refractive dielectric on a transparent substrate by vacuum deposition or by spin-coating.

A thicker low-refractive layer will provide a higher effect in light reflection. Specifically, for visible light with a wavelength ranging from 380 nm to 780 nm, an optical path length, which is calculated by multiplying a refractive index by film thickness, is at least a quarter wavelength, i.e., at least 950 nm with respect to a wavelength at the short wavelength side of 380 nm, so as to provide an effect of light reflection. It is more advantageous that the optical path length is at least a half, i.e., at least 190 nm, preferably, at least one wavelength or at least 380 nm, and more preferably, at least 600 nm.

It is preferable that the low-refractive layer has a refractive index lower than that of the optical controlling layer. The difference in the refractive indices are, for example, at least 0.05, or preferably, at least 0.1. Furthermore, a refractive index of a transparent substrate provided with an optical controlling layer and a light source on one side face is higher, e.g., by 0.05 at most, than that of a transparent substrate.

The optical controlling layer can be a transparent film. Such an optical controlling layer is bonded onto a surface of a liquid crystal panel via an adhesive layer. Light can be conducted to the optical controlling layer efficiently by using an adhesive layer having a refractive index larger than that of the low-refractive layer. As a result, light is reflected on the inclined surfaces of the light reflectors of the optical controlling layer, thereby illuminating the liquid crystal display efficiently.

In this case, a refractive index difference between the adhesive layer and the low-refractive layer is at least 0.05, preferably, at least 0.1. Similarly, the adhesive layer has a refractive index higher than that of the substrate, and a difference in the refractive indices between the adhesive layer and the substrate is at most 0.05. It is preferable that the adhesive layer is made of a pressure-sensitive adhesive for facilitating the bonding operation.

There is no specific limitation on the kinds of liquid crystal panels. For example, a TN liquid crystal panel, a STN liquid crystal panel, and a panel utilizing light dispersion can be used preferably. For a TN liquid crystal panel or a STN liquid crystal panel, at least one polarizing plate is arranged on at least one surface of the liquid crystal panel. Furthermore, at least one birefringent film is arranged between the polarizing plate and the substrate of the liquid crystal panel.

There is no specific limitation on the kind of the substrate. Transparent substrates such as colorless non-alkali glass are preferred from an aspect of light transmission. From an aspect of reducing weight, plastic substrates are preferred. For decreasing influences of birefringence and suppressing loss of the light, optically isotropic materials are preferred for the substrate.

It is preferable that the transparent substrate of the liquid crystal panel has a certain thickness for allowing light beams emitted from the light source to pass efficiently through the substrate.

Since a LCD according to the present invention is configured to use light transmitted through the liquid crystal panel, it is preferable that the substrate having a light source is thicker than the substrate having no light sources so as to improve the efficiency in receiving light emitted from the light source. On the other hand, the substrate having no light sources is preferred to be thinner so as to reduce the entire weight of the liquid crystal display. The above description is not limitative, but the upper substrate and the lower substrate of the liquid crystal panel can be equal to or different from each other in the thickness.

For improving efficiency in receiving light to the substrate, the substrate provided with a light source preferably has a larger surface area than the other substrates having no light source. Particularly, when a lighting device is provided on one end face of the substrate, a light-source reflector is provided to cover the light source and contact closely the upper and lower surfaces of the upper substrate so that light emitted from the light source enter the substrates efficiently.

The light-source reflector can be prepared by, e.g., depositing a silver thin film on a non-elastic plastic film.

The polarizer and polarizing plate according to the present invention can be used for self-luminance display such as an organic electroluminescence display (ELD), a plasma display (PD), and a field emission display (FED), as well as the above described liquid crystal displays.

The following description is about an ELD having a polarizing plate of the present invention. The ELD can be an organic/inorganic ELD provided with either a polarizer or a polarizing plate of the present invention.

In recent ELDs, for preventing reflection from an electrode in a black state in an ELD, use of an optical film such as a polarizer and a polarizing plate as well as a π/4 plate is proposed. The polarizer and the polarizing plate of the present invention are especially useful when linearly polarized light, circularly polarized light or elliptically polarized light is emitted from an EL layer. The polarizer and the polarizing plate are useful even when an oblique light beam is partially polarized even in the case where natural light is emitted in a front direction.

In general, an organic electroluminescence display (organic ELD) has a luminant (organic EL luminant) that is prepared by laminating a transparent electrode, an organic luminant layer and a metal electrode in a certain order on a transparent substrate. Here, the organic luminant layer is a laminated body of various organic thin films. Known examples thereof include a laminate of a hole injection layer made of triphenylamine derivative or the like and a luminant layer made of a phosphorous organic solid such as anthracene; a laminate of the luminant layer and an electron injection layer made of perylene derivative or the like; or a laminate of the hole injection layer, the luminant layer and the electron injection layer.

In general, the organic ELD emits light on the principle of a system of applying a voltage to an anode and a cathode so as to inject holes and electrons into the organic luminant layer, energy generated by the re-bonding of these holes and electrons excites the phosphor, and the excited phosphor emits light when it returns to the basis state. The mechanism of the re-bonding during the process is similar to that of an ordinary diode. This implies that current and the light emitting intensity exhibit a considerable nonlinearity accompanied by a rectification with respect to the applied voltage.

It is preferred for the organic ELD that at least one of the electrodes is transparent so as to obtain luminescence at the organic luminant layer. In general, a transparent electrode of a transparent conductive material such as indium tin oxide (ITO) is used for the anode. Use of substances having small work function for the cathode is effective for facilitating the electron injection and thereby raising luminous efficiency, and in general, metal electrodes such as Mg—Ag, and Al—Li may be used.

In an organic ELD configured as described above, the organic luminant layer is made of a film that is extremely thin such as about 10 nm. Therefore, the organic luminant layer can transmit substantially all the light that the transparent electrode transmits. As a result, when the layer does not illuminate, a light beam entering from the surface of the transparent substrate and passing through the transparent electrode and the organic luminant layer before being reflected at the metal layer comes out again to the surface of the transparent substrate. Thereby, the display surface of the organic ELD looks like a mirror when viewed from exterior.

It is preferable for the organic ELD according to the present invention that, for example, a polarizer or a polarizing plate of the present invention is arranged on a surface of the transparent electrode that is provided on the surface of the organic luminant layer while a metal electrode is provided on the backside of the same organic luminant layer. It is further preferable that a quarter wavelength plate is interposed between the polarizing plate and an EL device. The thus produced organic ELD will exhibit effects of suppressing reflection of external light and improving its visibility. It is advantageous that a retardation plate is further interposed between the transparent electrode and an optical film.

The retardation plate and the polarizer or the like function to polarize light which enters from outside and is reflected by the metal electrode, and thus the polarization has an effect that the mirror of the metal electrode cannot be viewed from the exterior. Particularly, the mirror of the metal electrode can be blocked completely by forming the retardation plate with a quarter wavelength plate and adjusting an angle formed by the polarization direction of the retardation plate and the polarizing plate to be π/4. That is, the polarizer transmits only the linearly polarized light constituent among the external light entering the organic ELD. In general, the linearly polarized light is changed into elliptically polarized light by the retardation plate. When the retardation plate is a quarter wavelength plate and when the angle is π/4, the light is changed into circularly polarized light.

Generally, this circularly polarized light passes the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. As a result, the mirror of the metal electrode can be blocked completely.

EXAMPLES

The present invention will be described below more specifically by referring to illustrative Examples, though the present invention is not restricted thereto.

Example 1

A polyvinyl alcohol film 80 μm in thickness was impregnated for 1 minute at 30° C. in an aqueous solution of 0.3 wt/v % iodine. Subsequently, the film was stretched three times its original length, and fiber stretched 5.5 times its original length while being impregnated for 2 minutes at 60° C. in an aqueous solution (6 liters) containing 4 wt/v % boric acid and 0.5 wt/v % potassium iodide. Later, the film was washed by impregnation in 30° C. pure water for 10 seconds, and dried for 4 minutes at 50° C. so as to obtain a polarizing plate.

Example 2

A polyvinyl alcohol film 80 μm in thickness was impregnated for 1 minute at 30° C. in an aqueous solution of 0.3 wt/v % iodine. Subsequently, the film was stretched three times its original length, and further stretched 5.5 times its original length while being impregnated for 2 minutes at 60° C. in an aqueous solution containing 4 wt/v % boric acid. Later, the film was washed by impregnation in 30° C. pure water for 10 seconds, and dried for 4 minutes at 50° C. so as to obtain a polarizing plate.

Example 3

A polyvinyl alcohol film 80 µm in thickness was impregnated for 1 minute at 30° C. in an aqueous solution of 0.3 wt/v % iodine. Subsequently, the film was stretched three times its original length, and further stretched 5.5 times its original length while being impregnated for 2 minutes at 60° C. in an aqueous solution (6 liters) containing 4 wt/v % boric acid and 0.8 wt/v % potassium iodide. Later, the film was washed by impregnation in 30° C. pure water for 10 seconds, and dried for 4 minutes at 50° C. so as to obtain a polarizing plate.

Example 4

A polyvinyl alcohol film 80 µm in thickness was impregnated for 1 minute at 30° C. in an aqueous solution of 0.3 wt/v % iodine. Subsequently, the film was stretched three times its original length, and further stretched 5.5 times its original length while being impregnated for 2 minutes at 60° C. in an aqueous solution (6 liters) containing 4 wt/v % boric acid and 1.3 wt/v % potassium iodide. Later, the film was washed by impregnation in 30° C. pure water for 10 seconds, and dried for 4 minutes at 50° C. so as to obtain a polarizing plate.

Comparative Example 1

A polyvinyl alcohol film 80 µm in thickness was impregnated for 1 minute at 30° C. in an aqueous solution of 0.3 wt/v % iodine. Subsequently, the film was stretched three times its original length, and further stretched 5.5 times its original length while being impregnated for 2 minutes at 60° C. in an aqueous solution (6 liters) containing 4 wt/v % boric acid and 5 wt/v % potassium iodide. Later, the film was washed by impregnation in 30° C. pure water for 10 seconds, and dried for 4 minutes at 50° C. so as to obtain a polarizing plate.

Comparative Example 2

A polyvinyl alcohol film 80 µm in thickness was impregnated for 1 minute at 30° C. in an aqueous solution of 0.3 wt/v % iodine. Subsequently, the film was stretched three times its original length, and further stretched 5.5 times its original length while being impregnated for 2 minutes at 60° C. in an aqueous solution (6 liters) containing 4 wt/v % boric acid. Later, the film was washed by impregnation at 30° C. in an aqueous solution containing 2% potassium iodide for 10 seconds, and dried for 4 minutes at 50° C. so as to obtain a polarizing plate.

Evaluation

A parallel transmittance and cross transmittance in a wavelength range of 400 nm to 700 nm were measured for each of the polarizing plates produced in Examples 1–4 and Comparative Examples 1–2, using a spectrophotometer (DOT-3C produced by Murakami Color Research Laboratory). Table 1 shows single transmittances after being subjected to luminosity correction, polarization degrees and the values 'a' and 'b' defined by a Hunter Lab Color System. Specifically, single, parallel and cross values 'a' and 'b' were calculated by measuring tristimulus values (X, Y, Z) of each sample by using a spectrophotometer or a photoelectric colorimeter in accordance with JIS K 7105 5.3, and substituting these values as the color difference formula in Lab space into the following Hunter's formula.

Single value 'a'=$17.5(1.02X_S-Y_S)/Y_S^{1/2}$

Single value 'b'=$7.0(Y_S-0.847Z_S)/Y_S^{1/2}$

Parallel value 'a'=$17.5(1.02X_P-Y_P)/Y_P^{1/2}$

Parallel value 'b'=$7.0(Y_P-0.847Z_P)/Y_P^{1/2}$

Cross value 'a'=$17.5(1.02X_C-Y_C)/Y_C^{1/2}$

Cross value 'b'=$7.0(Y_C-0.847Z_C)/Y_C^{1/2}$ (In the above equations, $X_S$, $Y_S$, and $Z_S$ denotes restively single tristimulus values, $X_P$, $Y_P$, and $Z_P$ denotes respectively parallel tristimulus values, and $X_C$, $Y_C$, and $Z_C$ denotes respectively cross tristimulus values.)

Also, a first main transmittance ($k_1$) was calculated from the values of the parallel transmittance and cross transmittance by using the following Equation 1:

$k_1=0.5\times\sqrt{2}\{[(H_0+H_{90})^{1/2}+(H_0-H_{90})^{1/2}]\}$ wherein $H_0$ denotes a parallel transmittance and $H_{90}$ denotes a cross transmittance.

Figure 5:
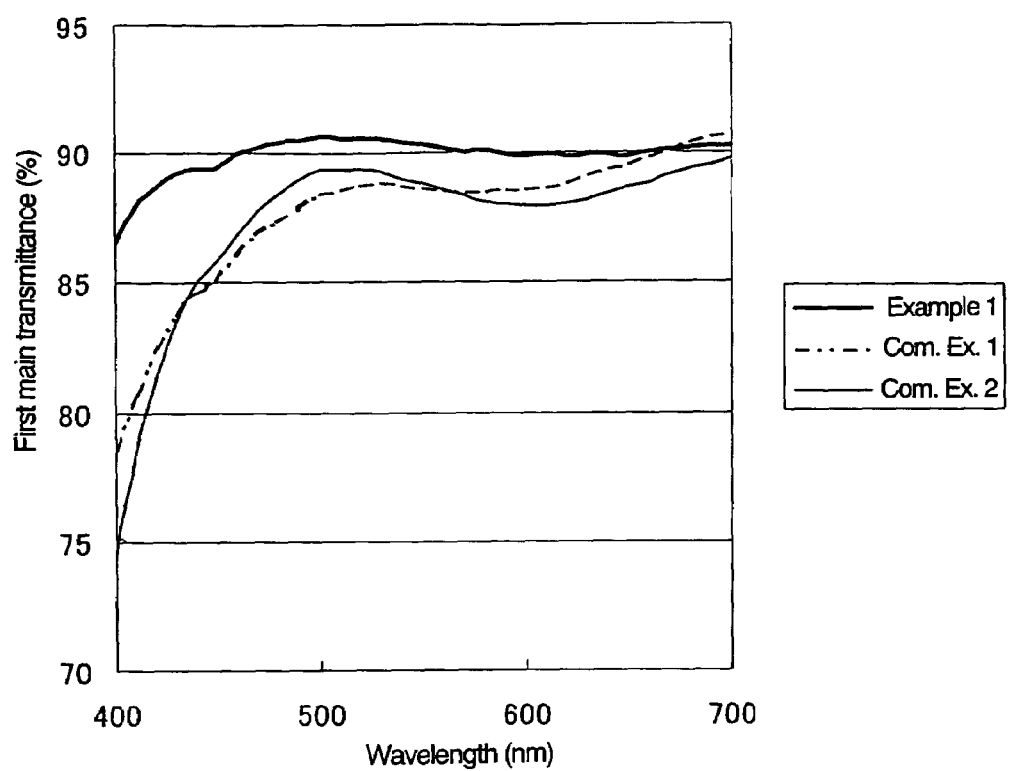
FIG. 5 is a spectrogram showing first main transmittances of polarizing plates at wavelengths ranging from 400 nm to 700 nm for Example 1 and Comparative Examples 1 and 2.
Figure 6:
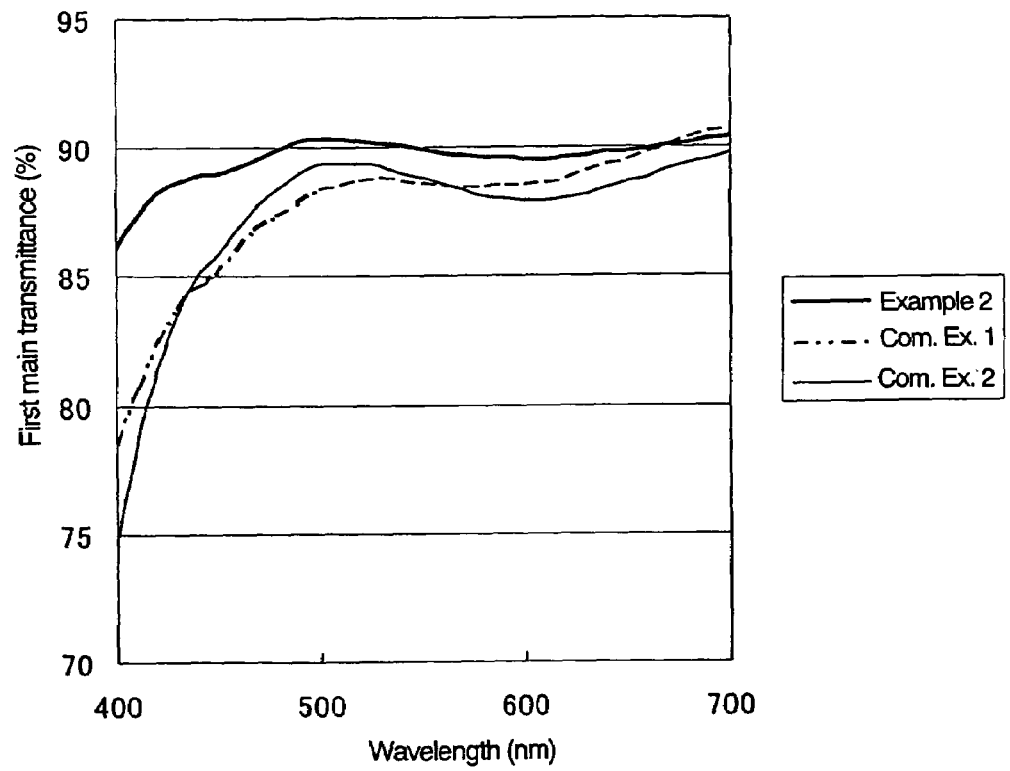
FIG. 6 is a spectrogram showing first main transmittances of polarizing plates at wavelength ranging from 400 nm to 700 nm for Example 2 and Comparative Examples 1 and 2.
Figure 7:
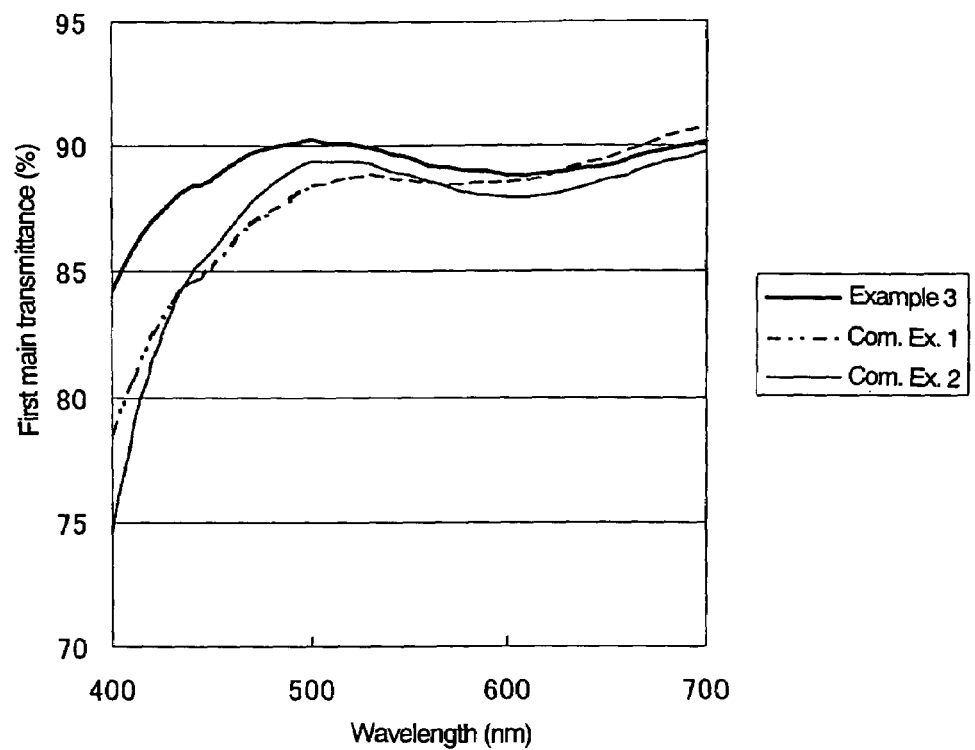
FIG. 7 is a spectrogram showing first main transmittances of polarizing plates at wavelengths ranging from 400 nm to 700 nm for Example 3 and Comparative Examples 1 and 2.
Figure 8:
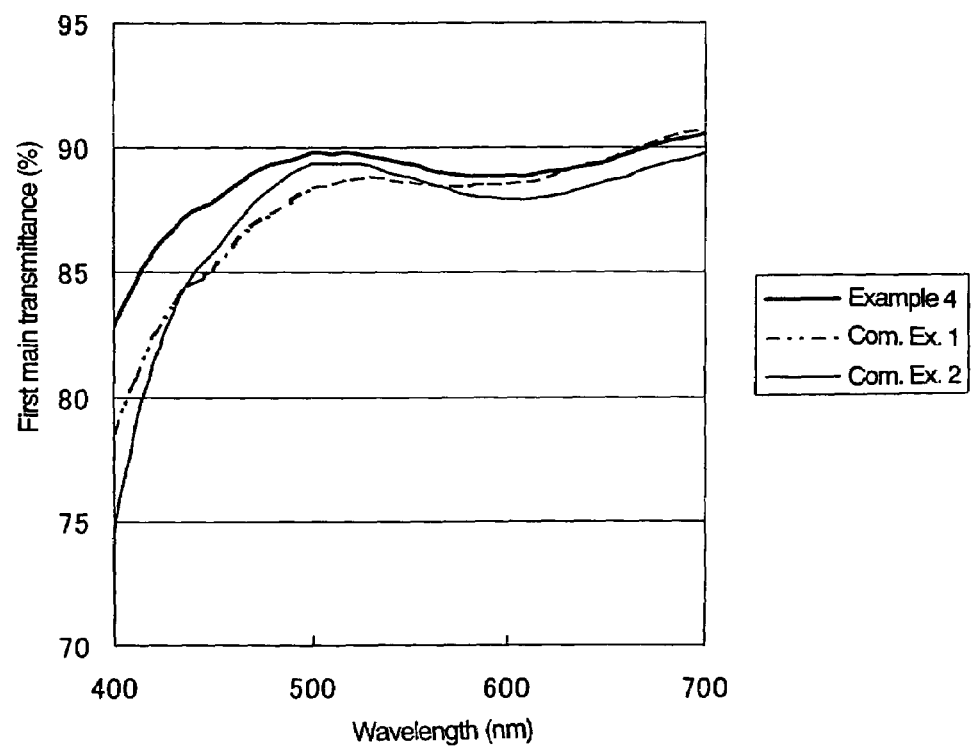
FIG. 8 is a spectrogram showing first main transmittances of polarizing plates at wavelengths ranging from 400 nm to 700 nm for Example 4 and Comparative Examples 1 and 2.

FIGS. 5–8 shows first main transmittance ($k_1$) spectra in wavelengths range of 400 nm to 700 nm. FIG. 5 shows spectra of polarizing plates in Example 1 and Comparative Examples 1 and 2, and FIG. 6 shows those of Example 2 and Comparative Examples 1 and 2. FIG. 7 shows spectra of polarizing plates in Example 3 and Comparative Examples 1 and 2, and FIG. 8 shows those of Example 4 and Comparative Examples 1 and 2.

FIGS. 5–8 show that a difference in the first transmittance between the maximum and the minimum in a wavelength range of 400 nm to 700 nm is: 4.1% in Example 1, 4.3% in Example 2, 6.0% in Example 3, 7.7% in Example 4, 12.2% in Comparative Example 1, and 15.2% in Comparative Example 2.

FIGS. 5–8 show that minimum values of the first main transmittance in a wavelength range of 400 nm to 700 nm is 86.5% in Example 1, 86.1% in Example 2, 84.2% in Example 3, 82.9% in Example 4, 78.6% in Comparative Example 1 and 74.6% in Comparative Example 2.

Example 5

Magnesium fluoride was vacuum-deposited to form a low-refractive layer on a non-alkali glass sheet having a thickness of 0.7 mm and a refractive index of 1.52. This sheet was used for an upper transparent substrate to form a transparent electrode by sputtering an ITO film. Here, the low-refractive layer had a refractive index of 1.38 and a thickness of 600 nm.

Similarly, another non-alkali glass sheet having a thickness of 0.7 mm and a refractive index of 1.52 was used to form a lower substrate. A UV-curable resin was coated on the surface and a previously-roughened film was bonded thereto. The UV-curable resin was cured by radiating by means of a metal halide lamp so as to peel the roughened film off from the cured resin, and thus the non-alkali glass sheet surface was roughened. Further, aluminum was deposited thereon so as to form a reflective electrode.

A 10 wt/v % aqueous solution containing polyvinyl alcohol was spin-coated on surfaces (surfaces located close to the electrode) of a pair of the above-described upper and lower substrates. Subsequent to drying, the coated solution was rubbed to form a rubbing film. The transparent electrode of the upper substrate was in a divided state due to a previous etching process. The transparent electrode was located to face the pair of substrates so that the rubbing directions would cross each other at a right angle. Spacers were disposed and the peripheries of the substrates were sealed with epoxy and a liquid crystal "ZL1-4792" supplied by Merck and Co., Inc. was injected, thereby producing a TN reflective liquid crystal cell. The upper substrate was longer than the lower substrate, and thus the upper substrate protruded by 2 mm at one end face through which light would enter. The polarizing plates of Example 1 were bonded on both surfaces by applying pressure, thereby producing a normally-white reflective liquid crystal panel. The liquid crystal panel was 45 mm in width, 34 mm in length, and 1.6 mm in thickness.

A cold cathode ray tube as a light source was arranged on a face of the reflective liquid crystal panel. The light source was covered with a light-source reflector prepared by depositing silver on a polyethylene terephthalate (PET) film, leaving uncovered a part to be contacted with a surface of the liquid crystal panel. The light-source reflector was stuck on the upper and lower surfaces of the upper substrate with a double-coated tape in order to prevent leakage of light.

A UV-curable acrylic resin was dripped with a pipette on a previously-processed mold. A triacetylcellulose (TAC) film having a thickness of 80 μm was placed on the resin and pressed with a rubber roller so as to be in a close contact with the resin and remove excessive resin and bubbles. This laminate was irradiated to cure by means of a metal halide lamp. Later, the film was peeled off from the mold and cut to have a predetermined size. The TAC film was peeled off to provide an optical film as an optical controlling film. The cured UV-curable resin had a refractive index of 1.51 in a measurement with an ellipsometer.

The thus obtained optical film was 40 mm in width, 30 mm in length, and 75 μm in thickness, and had light reflectors that were continuous in the width direction. Each of the light reflectors was formed parallel to the short side. The light reflectors were formed as continuous concavities located parallel to each other at a pitch of 210 μm, each of them having a cross section of a substantial triangle composed of inclined surfaces and a plane. Each of the light reflectors had an angle of 21° with respect to the width direction. The width of the inclined surfaces ranges from 10 μm to 16 μm and the angle was 42°, and the plane had an angle ranging from 1.8° to 3.5°. The angle of the adjacent plane varied by at most 0.1°. The plane had a surface area at least 12 times the area of the inclined surface.

A film of an acrylic pressure-sensitive adhesive was stuck to one surface of this optical film opposite to the surface formed with a light reflector. Then, the optical film was heated and degassed in an autoclave so as to allow the adhesive to be in a close contact with the surface, providing an optical controlling layer having an adhesive layer. The pressure-sensitive adhesive had a refractive index of 1.53.

An optical controlling layer was laminated on the surface of the reflective liquid crystal panel so that the adhesive layer faces the upper transparent substrate of the liquid crystal panel, thereby producing a reflective liquid crystal display.

Example 6

A liquid crystal display was produced as in Example 5 except that the polarizing plate of Example 1 was replaced by the polarizing plate of Example 2.

Example 7

A liquid crystal display was produced as in Example 5 except that the polarizing plate of Example 1 was replaced by the polarizing plate of Example 3.

Example 8

A liquid crystal display was produced as in Example 5 except that the polarizing plate of Example 1 was replaced by the polarizing plate of Example 4.

Comparative Example 3

A liquid crystal display was produced as in Example 5 except that the polarizing plate of Example 1 was replaced by the polarizing plate of Comparative Example 1.

Comparative Example 4

A liquid crystal display was produced as in Example 5 except that the polarizing plate of Example 1 was replaced by the polarizing plate of Comparative Example 2.

Figure 9:
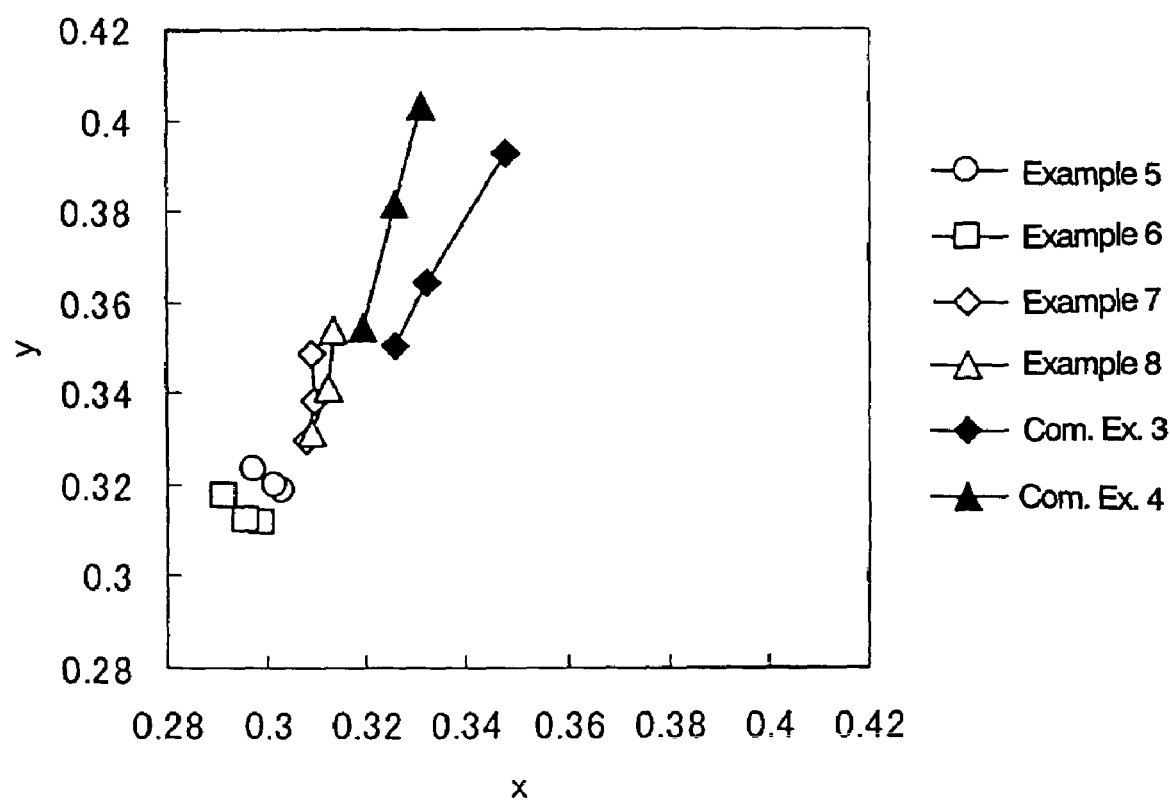
FIG. 9 is a chromaticity diagram based on a CIE 1931 color system of liquid crystal displays for Examples 5–8 and Comparative Examples 3–4.

For the liquid crystal displays produced in Examples 5–8 and Comparative Examples 3–4, the brightness in the front direction, and chromaticity based on a CIE 1931 color system were measured using a spectral light meter CS-1000 manufactured by Minolta Co., Ltd. At this time, the liquid crystal panel was not applied with voltage, and the screen was white as a whole. The measurement points on the liquid crystal panel were separated from a light source by 5 mm, 15 mm, and 25 mm respectively. The results are shown in FIG. 9.

TABLE 1

| | Single transmittance (%) | Polarization degree (%) | Single value 'a' | Single value 'b' | Parallel value 'a' | Parallel value 'b' | Cross value 'a' | Cross value 'b' |
|---|---|---|---|---|---|---|---|---|
| Example 5 | 46.0 | 96.7 | 1.3 | −5.3 | −0.4 | −0.7 | 18.0 | −57.0 |
| Example 6 | 46.1 | 97.3 | 1.6 | −4.9 | −0.1 | −0.3 | 22.3 | −60.9 |
| Example 7 | 45.8 | 96.5 | 0.2 | −3.7 | −0.8 | 0.1 | 8.2 | −40.8 |
| Example 8 | 46.0 | 96.4 | −0.1 | −3.1 | −0.9 | 0.3 | 5.1 | −35.3 |
| Com. Ex. 3 | 44.7 | 99.7 | −0.8 | 1.6 | −1.3 | 3.0 | 0.5 | −7.5 |
| Com. Ex. 4 | 44.8 | 99.4 | −1.0 | 0.7 | −2.1 | 2.5 | 3.4 | −17.7 |

It is observed from a comparison between the results of Examples 5–8 and those of Comparative Examples 3–4 that variation in a chromaticity diagram for the liquid crystal panel is decreased and whitening will be suppressed when the polarizing plate used has a difference of at most 10% between a maximum and a minimum of the first main transmittance in a wavelength range of 400 nm to 700 nm.

EFFECT OF THE INVENTION

As described above, coloring of transmitted light can be suppressed by using a polarizer or a polarizing plate of the present invention for an image display such as a liquid crystal display.

What is claimed is:

1. A polarizer comprising a polymer film, wherein a difference between a maximum and a minimum of a first main transmittance of the polarizer in a wavelength range of from 400 nm to 700 nm is 10% or less, wherein the polymer film has been dyed substantially with a single dichroic dyestuff.

2. The polarizer according to claim 1, wherein the minimum of the first main transmittance in the wavelength range of from 400 nm to 700 nm is 70% or more.

3. The polarizer according to claim 1, wherein a single transmittance is at least 45% after being subjected to a luminosity correction by an auxiliary luminant C in a 2° visual field, and a polarization degree is 95% or more.

4. The polarizer according to claim 1, wherein a parallel value b defined by a Hunter Lab Color System ranges from −2 to 0.5.

5. A polarizing plate comprising the polarizer according to claim 1 and a transparent protective layer, wherein the transparent protective layer is laminated on at least one surface of the polarizer.

6. A liquid crystal display comprising a liquid crystal panel and the polarizer according to claim 1.

7. The liquid crystal display according to claim 6, further comprising a light source for illuminating the interior of the liquid crystal display and an optical controlling layer for reflecting light emitted from the light source and transmitted through the interior of the liquid crystal panel, wherein
the light source is disposed on at least one side of the liquid crystal panel;
the optical controlling layer is disposed on a surface of the liquid crystal panel; and
the polarizing plate is located between the liquid crystal panel and the optical controlling layer.

8. The liquid crystal display according to claim 6, further comprising a retardation plate, wherein
the retardation plate is located between the polarizer and the liquid crystal panel.

9. A liquid crystal display comprising a liquid crystal panel and the polarizing plate according to claim 5.

10. The liquid crystal display according to claim 9, further comprising a light source for illuminating the interior of the liquid crystal display and an optical controlling layer for reflecting light emitted from the light source and transmitted through the interior of the liquid crystal panel, wherein
the light source is disposed on at least one side of the liquid crystal panel;
the optical controlling layer is disposed on a surface of the liquid crystal panel; and
the polarizing plate is located between the liquid crystal panel and the optical controlling layer.

11. The liquid crystal display according to claim 9, further comprising a retardation plate, wherein
the retardation plate is located between the polarizing plate and the liquid crystal panel.

12. An image display selected from the group consisting of a liquid crystal display, a plasma display and an electroluminescence display, the image display comprising the polarizer according to claim 1.

13. An image display selected from the group consisting of a liquid crystal display, a plasma display and an electroluminescence display, the image display comprising the polarizing plate according to claim 5.

14. The polarizer according to claim 1, which has a single transmittance of at least 45% after being subjected to a luminosity correction by an auxiliary luminant C in a 2° visual field.

15. The polarizer according to claim 1, wherein the polarizer has a single layer structure.

16. The polarizer according to claim 15, wherein the single layer structure is a dyed and stretched hydrophilic polymer film.

17. The polarizer according to claim 1, which is produced by the method comprising:
impregnating a polymer film in a solution of a dichroic dyestuff for dyeing;
impregnating the film in a solution of boric acid;
stretching the film at least once in the solution of boric acid;
impregnating the film in pure water so as to wash the film; and
drying the film,
wherein the solution of boric acid contains further potassium iodide of 1.5 wt/v % or less.

* * * * *